United States Patent
Jung et al.

(10) Patent No.: US 12,172,499 B2
(45) Date of Patent: Dec. 24, 2024

(54) SYSTEM AND METHOD FOR HUMIDIFICATION OF FUEL CELL ELECTRIC VEHICLE

(71) Applicants: Hyundai Motor Company, Seoul (KR); Kia Corporation, Seoul (KR)

(72) Inventors: Tae Hun Jung, Seoul (KR); Biermann Albert, Gyeonggi-do (KR); Moo Sang Kim, Gyeonggi-do (KR); Seong Bin Jeong, Gyeonggi-Do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 323 days.

(21) Appl. No.: 17/708,987

(22) Filed: Mar. 30, 2022

(65) Prior Publication Data
US 2023/0011951 A1 Jan. 12, 2023

(30) Foreign Application Priority Data
Jul. 8, 2021 (KR) .................. 10-2021-0089974

(51) Int. Cl.
*B60H 3/02* (2006.01)
*B60S 1/54* (2006.01)
(Continued)

(52) U.S. Cl.
CPC .............. *B60H 3/022* (2013.01); *B60S 1/54* (2013.01); *H01M 8/04067* (2013.01);
(Continued)

(58) Field of Classification Search
CPC ............ B60H 3/022; B60H 3/0028; B60H 1/00385; B60H 1/00392; B60H 1/0005;
(Continued)

(56) References Cited

U.S. PATENT DOCUMENTS

| 4,718,244 A | 1/1988 | Kobayashi |
| 5,466,911 A | 11/1995 | Spagnoli et al. |
| 6,467,698 B2 * | 10/2002 | Gaarder ............... B60H 3/022 165/41 |
| 11,701,949 B2 * | 7/2023 | Jeong ............... H01M 8/04119 62/91 |
| 2010/0107656 A1 * | 5/2010 | Nakaguro ............ F24F 5/0042 62/3.4 |
| 2010/0107673 A1 * | 5/2010 | Nakaguro ............ F24F 3/1411 62/271 |

(Continued)

FOREIGN PATENT DOCUMENTS

| JP | H03-79975 A | 4/1991 |
| JP | H09-156360 A | 6/1997 |

(Continued)

*Primary Examiner* — Marc E Norman
(74) *Attorney, Agent, or Firm* — Fox Rothschild LLP

(57) ABSTRACT

A system for humidification of a fuel cell electric vehicle includes a fuel cell stack for producing electrical energy through an electrochemical reaction of hydrogen and oxygen, a water supply tank for storing water generated during power generation in the fuel cell stack, a first duct for supplying air exhausted from a heating, ventilation, and air conditioning (HVAC) apparatus to a vehicle glass, a second duct for supplying air exhausted from the HVAC apparatus into the vehicle interior, a humidification apparatus for humidifying air supplied through the second duct using water supplied from the water supply tank, and a controller that supplies air to the vehicle glass through the first duct to perform anti-fogging control of the vehicle glass when adjusting an inside humidity of the vehicle using the humidification apparatus.

19 Claims, 15 Drawing Sheets

(51) Int. Cl.
*H01M 8/04* (2016.01)
*H01M 8/04007* (2016.01)
*H01M 8/04119* (2016.01)
*H01M 8/06* (2016.01)
*H01M 8/0662* (2016.01)

(52) U.S. Cl.
CPC ..... *H01M 8/04156* (2013.01); *H01M 8/0662* (2013.01); *H01M 2250/20* (2013.01)

(58) Field of Classification Search
CPC ........... H01M 8/0406; H01M 8/04156; H01M 8/0662; H01M 8/04126; H01M 8/04141; H01M 8/04291; H01M 8/40835; H01M 2250/20; Y02T 90/40; B60S 1/54
See application file for complete search history.

(56) References Cited

U.S. PATENT DOCUMENTS

| | | |
|---|---|---|
| 2018/0029447 A1 | 2/2018 | Kato et al. |
| 2018/0102558 A1* | 4/2018 | Noh ................. B60L 58/34 |
| 2018/0359815 A1 | 12/2018 | Han |
| 2021/0148590 A1* | 5/2021 | Aschenberg ......... F24F 11/0008 |
| 2022/0324299 A1 | 10/2022 | Jeong et al. |

FOREIGN PATENT DOCUMENTS

| | | |
|---|---|---|
| KR | 2004-0016317 A | 2/2004 |
| KR | 2008-0046861 A | 5/2008 |
| KR | 2017-0079566 A | 7/2017 |
| KR | 2019-0079872 A | 7/2019 |
| KR | 10-2022-0141696 A | 10/2022 |

* cited by examiner

SYSTEM AND METHOD FOR HUMIDIFICATION OF FUEL CELL ELECTRIC VEHICLE

CROSS-REFERENCE TO RELATED APPLICATION

This application claims under 35 U.S.C. § 119(a) the benefit of Korean Patent Application No. 10-2021-0089974, filed in the Korean Intellectual Property Office on Jul. 8, 2021, the entire contents of which are incorporated herein by reference.

BACKGROUND

(a) Technical Field

The present disclosure relates to a humidification system and method for controlling inside humidity of a fuel cell electric vehicle.

(b) Description of the Related Art

As an inside humidity of a vehicle rapidly decreases during cooling or heating in the vehicle, a vehicle interior becomes dry, so that a driver or passenger may feel discomfort in his or her eyes, skin, and the like. To address such discomfort, a humidifier has been used in the vehicle. However, there is a problem in that moisture, frost, or the like may form on a window glass when the humidifier for the vehicle is operating, which may obstruct a view of the driver. In addition, there is inconvenience in that a water tank of the humidifier must be periodically checked to replenish water.

SUMMARY

An aspect of the present disclosure provides a system and a method for humidification of a fuel cell electric vehicle for controlling an inside humidity of the vehicle using water generated during power generation in a fuel cell stack.

Another aspect of the present disclosure provides a system and a method for humidification of a fuel cell electric vehicle that perform associated control of dualizing air exhausted from a heating, ventilation, and air conditioning (HVAC) apparatus during inside humidification to supply dry air to a window and to supply humidified air into the vehicle for fundamentally blocking fogging (moisture generation) of a window glass resulted from a difference between an inside and outside temperatures of the vehicle.

Another aspect of the present disclosure provides a system and a method for humidification of a fuel cell electric vehicle that minimize window moisture generation by exhausting humidified air supplied into the vehicle directly to the outside.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a system for humidification of a fuel cell electric vehicle includes a fuel cell stack for generating electrical energy through an electrochemical reaction of hydrogen and oxygen, a water supply tank for storing water generated during the electrical energy generation in the fuel cell stack, a first duct for supplying air exhausted from an HVAC apparatus to a vehicle glass, a second duct for supplying air exhausted from the HVAC apparatus into a vehicle interior, a humidification apparatus for humidifying air supplied through the second duct using water supplied from the water supply tank, and a controller that supplies air to the vehicle glass through the first duct to perform anti-fogging control of the vehicle glass when adjusting an inside humidity of the vehicle using the humidification apparatus.

In one implementation, the first duct may guide dry air exhausted from the HVAC apparatus to at least one of a wind shield glass and/or a side glass of the vehicle, and the second duct may guide air humidified by the humidification apparatus to a vent hole located in at least one of a center and/or a floor of each seat row of the vehicle.

In one implementation, the controller may control the HVAC apparatus to maintain an outside air circulation mode during the humidification.

In one implementation, the controller may control a check valve mounted on a humidification line for connecting the second duct and the humidification apparatus to each other to prevent moisture remaining in the humidification line from flowing back into the HVAC apparatus.

In one implementation, the controller may collect initial sensor data using at least one sensor, and determine prohibition of an operation of a humidification function based on the sensor data, and the at least one sensor may include at least one of an outside air temperature sensor, an inside temperature sensor, a surface temperature sensor, a humidity sensor, a coolant temperature sensor, and/or a vent temperature sensor.

In one implementation, the humidification apparatus may include a water trap for storing water supplied from the water supply tank, a first humidifier including an ultrasonic generator for generating an ultrasonic wave to decompose water stored in the water trap, and a second humidifier including a heating apparatus for heating water supplied from the water supply tank to generate water vapor and supplying the generated water vapor to the second duct.

In one implementation, the controller may perform control such that the inside humidity maintains a target humidity by operating the humidification apparatus when a vehicle temperature has become stable.

In one implementation, the controller may control the inside humidity to maintain the target humidity by adjusting at least one of a humidification time point and/or a humidification amount based on an inside temperature of the vehicle.

According to another aspect of the present disclosure, a method for humidification of a fuel cell electric vehicle includes adjusting, by a controller, an inside humidity of the vehicle using a humidification apparatus, and performing, by the controller, anti-fogging control of a vehicle glass by supplying air to the vehicle glass through a first duct when adjusting the inside humidity.

In one implementation, the adjusting of the inside humidity of the vehicle may include collecting initial sensor data using at least one sensor, determining prohibition of an operation of a humidification function based on the sensor data, determining whether a vehicle temperature has become stable when the operation of the humidification function is permitted, and performing control such that the inside humidity maintains a target humidity by operating the humidification apparatus when the vehicle temperature has become stable, and the sensor data may include at least one of an outside air temperature, an inside temperature, a window surface temperature, the inside humidity, a coolant temperature, and/or a vent temperature.

In one implementation, the performing of the control such that the inside humidity maintains the target humidity may include adjusting at least one of a humidification time point and/or a humidification amount based on the inside temperature of the vehicle.

In one implementation, the adjusting of the inside humidity of the vehicle may include determining an operation mode of the humidification apparatus based on at least one of a vehicle state, an HVAC apparatus state, and/or an inside temperature of the vehicle.

In one implementation, the determining of the operation mode may include determining whether a water level of the water supply tank exceeds a reference water level when a humidification function is in an inactive state while the vehicle is being parked or stopped, and determining the operation mode as an evaporation drainage mode when the water level of the water supply tank exceeds the reference water level.

In one implementation, the adjusting of the inside humidity of the vehicle may include vaporizing water supplied from the water supply tank into water vapor using a heating apparatus, and exhausting the water vapor vaporized by the heating apparatus to the outside of the vehicle.

In one implementation, the determining of the operation mode may include determining whether a heating function is in an active state when a humidification function is in an active state, measuring the inside temperature using a sensor and comparing the measured inside temperature with a target temperature when the heating function is in the active state, and determining the operation mode as a heating humidification mode when the inside temperature is lower than the target temperature.

In one implementation, the adjusting of the inside humidity of the vehicle may include heating water supplied from the water supply tank using a heating apparatus, and supplying water vapor vaporized by the heating of the heating apparatus to the second duct.

In one implementation, the determining of the operation mode may further include determining the operation mode as an ultrasonic humidification mode when the heating function is in an inactive state.

In one implementation, the adjusting of the inside humidity of the vehicle may further include supplying water stored in the water supply tank to a water trap in the humidification apparatus by controlling a pump located between the water supply tank and the humidification apparatus, decomposing water inside the water trap by operating an ultrasonic generator installed inside the water trap, and supplying the decomposed water to the second duct.

In one implementation, the determining of the operation mode may further include determining the operation mode as a hybrid humidification mode when the inside temperature is equal to or higher than the target temperature.

In one implementation, the adjusting of the inside humidity of the vehicle may further include supplying water stored in the water supply tank to a heating apparatus and a water trap in the humidification apparatus, decomposing water inside the water trap by operating an ultrasonic generator in the water trap, generating, by the heating apparatus, water vapor by heating water supplied from the water supply tank, and supplying the water vapor and the decomposed water to the second duct.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
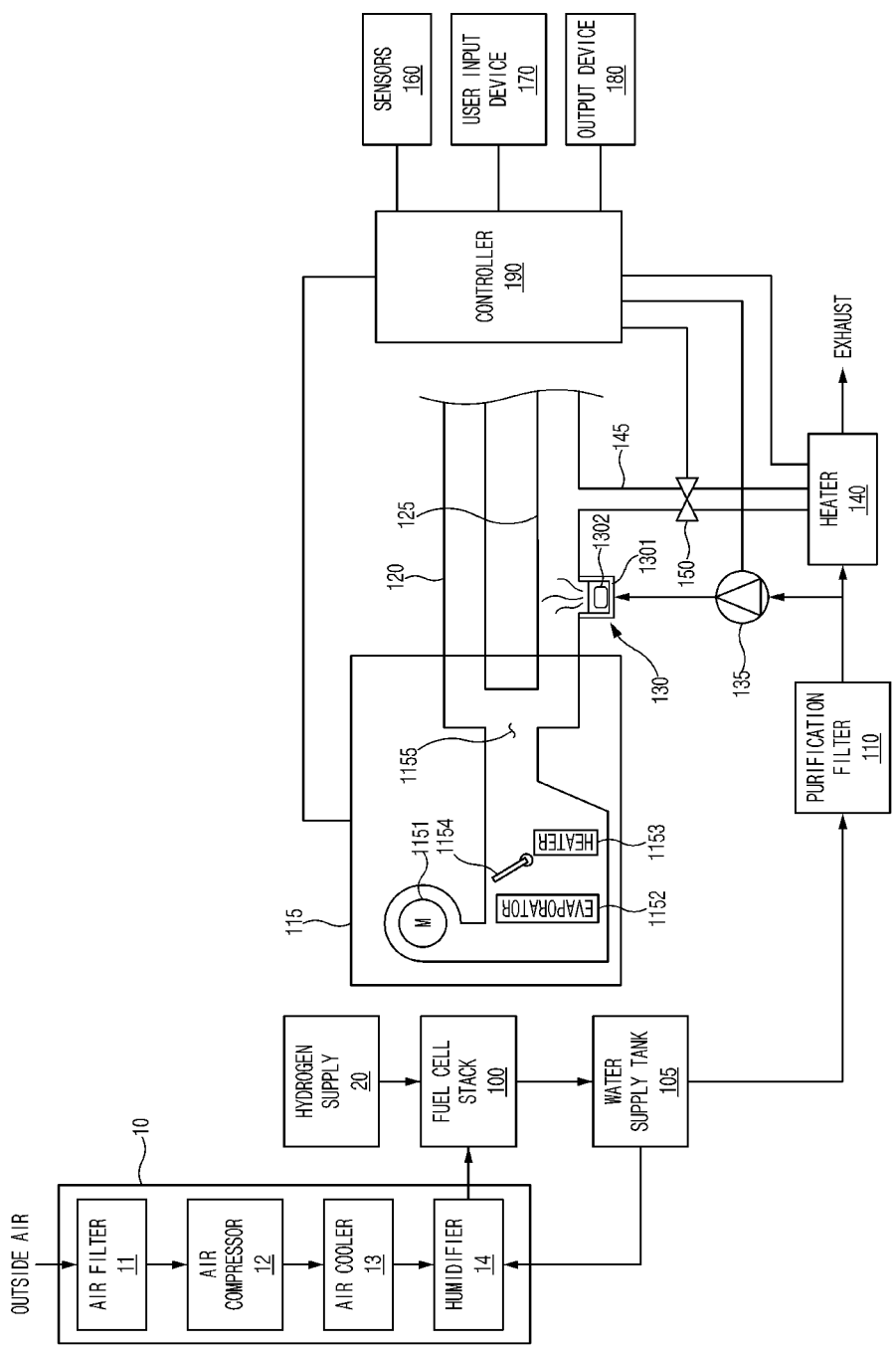
FIG. 1 is a block diagram illustrating a humidification system of a fuel cell electric vehicle according to embodiments of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating a humidification system of a fuel cell electric vehicle according to embodiments of the present disclosure.

Referring to FIG. 1, a humidification system of a fuel cell electric vehicle (FCEV) may include an air supply 10, a hydrogen supply 20, a fuel cell stack 100, a water supply tank 105, a purification filter 110, a heating, ventilation, and air conditioning (HVAC) apparatus 115, a first duct 120, a second duct 125, a humidification apparatus 130, a pump 135, a heating apparatus 140, a valve 150, sensors 160, a user input device 170, an output device 180, and a controller 190.

The air supply 10 may suck air (outside air) from the outside and supply the sucked air to the fuel cell stack 100. The air supply 10 may include an air filter 11, an air compressor 12, an air cooler 13, a humidifier 14, and the like.

The air filter 11 may remove foreign substances, harmful gases, and the like contained in the air sucked from the outside. A chemical filter may be used as the air filter 11.

The air compressor 12 may compress air that has passed through the air filter 11. The air compressor 12 may include a compressing device, a high-speed motor, and the like. The air compressor 12 may be connected to a power electronics (PE) cooling line to cool heat generated by a motor operation. In this connection, the PE cooling line may be a passage along which coolant circulating in a PE system flows.

The air cooler 13 may cool the air whose temperature has raised during the compression in the air compressor 12. The air cooler 13 may be located between the air compressor 12 and the humidifier 14 and may be connected to the PE cooling line. The air cooler 13 may cool the heated air using the coolant circulating in the PE cooling line.

The humidifier 14 may provide moisture (water vapor) to the air supplied to the fuel cell stack 100. The humidifier 14 may reuse water generated from the fuel cell stack 100 for humidification. The humidifier 14 may be applied to protect an electrolyte membrane of the fuel cell stack 100.

The hydrogen supply 20 may supply hydrogen stored in a hydrogen tank (not shown) to the fuel cell stack 100. The hydrogen supply 20 may control a valve located at an outlet end of the hydrogen tank to control an amount of hydrogen supplied to the fuel cell stack 100.

The fuel cell stack 100 may generate electric energy by an electrochemical reaction between hydrogen supplied from the hydrogen supply 20 and oxygen collected from the outside air. The fuel cell stack 100 may include two catalyst electrodes, that is, an anode (a positive electrode) and a cathode (a negative electrode). When the hydrogen and the oxygen are supplied to the anode and cathode, respectively, the anode may separate the hydrogen into protons, that is, hydrogen ions, and electrons. The hydrogen ions may move to the cathode through an electrolyte layer, and the hydrogen ions may be combined with the oxygen at the cathode to produce water ($H_2O$). The electrons may generate current through an external circuit. The electrical energy generated from the fuel cell stack 100 may be stored in a high-voltage battery (not shown) or may be directly supplied to a driving motor (not shown). The fuel cell stack 100 may exhaust the produced water together with the electrical energy to the outside.

The water supply tank 105 may store water exhausted from the fuel cell stack 100. The water supply tank 105 may include a water level sensor for checking a water level inside the tank. The water supply tank 105 may be connected to the humidifier 14 and the HVAC apparatus 115 through a pipe, a hose, or the like. The water supply tank 105 may supply the water to the humidifier 14 or the HVAC apparatus 115. A valve and/or an ejector may be installed at an outlet of the water supply tank 105. The controller 190 may control the supply of the water to the humidifier 14 and/or the HVAC apparatus 115 by controlling the valve and/or the ejector of the water supply tank 105.

The purification filter 110 may purify the water exhausted from the water supply tank 105. In other words, the purification filter 110 may remove foreign substances and/or harmful substances contained in the water exhausted from the water supply tank 105.

The HVAC apparatus 115 may adjust a temperature and a humidity of a vehicle interior, cleanliness of the air, and the like. The HVAC apparatus 115 may include a motor 1151, an evaporator 1152, a heater 1153, a temp door 1154, a vent 1155, and the like.

The motor 1151 may drive a fan of a blower to blow the outside air and/or inside air into the vehicle.

The evaporator 1152 may evaporate a refrigerant circulating along a refrigerant cycle formed by an operation of a refrigerant compressor during a cooling operation to exhaust the refrigerant in a low-pressure, low-temperature gaseous state. In this connection, the refrigerant may absorb heat from a cabin while evaporating. In other words, the evaporator 1152 may cool the air during the cooling and supply the cooled air into the vehicle.

The heater 1153 may be supplied with the coolant of a high temperature flowing along a powertrain (PT). The heater 1153 may transmit heat to the cabin (a passenger compartment) using the coolant of the high temperature as a heat source. That is, the heater 1153 may heat the air using the coolant circulating in the PT cooling line and supply the heated air into the vehicle.

The evaporator 1152 and the heater 1153 may be collectively referred to as a heat exchanger that adjusts the inside temperature of the vehicle through a heat exchange process.

The temp door 1154 is mounted to be opened and closed around a hinge point fixed inside the HVAC apparatus 115 to allow the air cooled by the evaporator 1152 and/or the air heated by the heater 1153 to pass therethrough.

The vent 1155 may exhaust the cooled air (cold air) and/or the heated air (hot air) into the vehicle. The vent 1155 may exhaust dry cold air and/or hot air.

The first duct 120 and the second duct 125 may be formed by being connected to the vent 1155 of the HVAC apparatus 115. The first duct 120 may guide the air exhausted from the HVAC apparatus 115 to a vent hole installed around vehicle glasses (a window glasses). For example, the first duct 120 may provide a passage for the dry air exhausted from the HVAC apparatus 115 to flow to a wind shield glass and/or a side glass. The second duct 125 may supply the air exhausted from the HVAC apparatus 115 into the vehicle interior. The second duct 125 may be connected to a vent hole located at a center of each seat row of the vehicle and/or a vent hole located in a floor of each seat row of the vehicle.

The humidification apparatus (a first humidifier) 130 may humidify air supplied through the second duct 125 using the water supplied from the water supply tank 105. The humidification apparatus 130 may include a water trap 1301, an ultrasonic generator 1302, and the like.

The water trap 1301 may store the water supplied from the water supply tank 105. A water level sensor (not shown) that senses a water level may be included inside the water trap 1301.

The ultrasonic generator 1302 may be mounted on an inner bottom surface of the water trap 1301. The ultrasonic generator 1302 may vibrate the water in the water trap 1301 to convert the water into fine particles (water particles or water molecules). The ultrasonic generator 1302 may include an ultrasonic vibrator, an ultrasonic circuit, and the like. The water trap 1301 and the ultrasonic generator 1302 may be collectively referred to as an ultrasonic humidifier.

The pump 135 may be mounted on a connection pipe (e.g., a pipe or a hose) that connects the purification filter 110 and the water trap 1301 to each other. The pump 135 may pump the water exhausted from the water supply tank 105 and supply the water to the water trap 1301.

The heating apparatus 140 may heat the water that has passed through the purification filter 110 to convert the water into water vapor, that is, gas. The heating apparatus 140 may supply the vaporized water vapor to the second duct 125 or may exhaust the vaporized water vapor to the outside through an exhaust pipe.

An inlet pipe 145 may connect the second duct 125 and the heating apparatus 140 to each other. The inlet pipe 145 may provide a passage along which the water vapor exhausted from the heating apparatus 140 flows to the second duct 125.

The valve 150 may be installed on the inlet pipe 145 that connects the second duct 125 and the heating apparatus 140 to each other. The valve 150 may adjust an amount of the gas (the water vapor) vaporized by the heating apparatus 140 flowing into the second duct 125. The valve 150 may be implemented as a 2-way valve.

The sensors 160 may measure an outside air temperature, the inside temperature, an inside surface temperature of the window glass (a window surface temperature), the inside humidity (a relative humidity and/or an absolute humidity), a coolant temperature, and/or a vent temperature of the HVAC apparatus 115. The sensors 160 may include an outside air temperature sensor (an ambient (AMB) sensor), an inside temperature sensor (an in-car sensor), a surface temperature sensor (an auto defog system (ADS) sensor), a humidity sensor, a water temperature sensor (WTS), and/or a vent temperature sensor.

The user input device 170 may be a human interface device (HID) that generates data in response to manipulation of a user. For example, the user input device 170 may generate data for turning on or off a cooling, a heating, and/or a humidification function in response to a user input. The user input device 170 may be installed on a steering wheel, a dashboard, a center fascia, and/or a door trim. The user input device 170 may be implemented as a keypad, a button, a switch, a touch pad, and/or a touch screen.

The output device 180 may output information such as visual information, auditory information, and/or tactile information under control of the controller 190. The output device 180 may include at least one of display means such as a liquid crystal display (LCD), an organic light-emitting diode (OLED) display, a head-up display (HUD), a touch screen, a cluster, and the like. The output device 180 may include an audio output device such as a speaker and the like capable of outputting pre-stored audio data, and may include a haptic device that outputs a signal (e.g., a vibration) in a form that the user may recognize by a tactile sense.

The controller 190 may control overall operations of the humidification system. The controller 190 is a full automatic temperature control (FATC) device. The controller 190 may include at least one processor and a memory. In this connection, the processor may be implemented as at least one of processing devices such as a central processing unit (CPU), a microcontroller, and/or a microprocessor. The memory may be a non-transitory storage medium that stores instructions executed by the processor. The memory may store various setting information, a lookup table, and the like. The memory may include a hard disk drive (HDD), a solid state disk (SSD), an embedded multimedia card (eMMC), a flash memory, a read only memory (ROM), a programmable read only memory (PROM), an electrically erasable and programmable ROM (EEPROM), and/or an erasable and programmable ROM (EPROM).

The controller 190 may operate the humidification system in a state in which power is supplied to the vehicle. When the operation of the humidification system starts, the controller 190 may determine whether the vehicle is in a parked or stopped state. For example, the controller 190 may determine whether a shift stage is a "P" stage when a start button is in an accessory power on (ACC ON) state or in a vehicle power on (ON) state. The controller 190 may determine that the vehicle is in the parked or stopped state when the shift stage is the "P" stage in the vehicle accessory power on state or the vehicle power on state.

The controller 190 may control an inside and outside air door of the HVAC apparatus 115 to maintain a state of the outside air when the humidification system operates. The controller 190 may maintain an air circulation mode of the HVAC apparatus 115 as an outside air circulation mode during the humidification. The controller 190 may adjust an opening amount of a vent hole door based on a humidification amount. The controller 190 may limit a maximum opening amount of the vent hole door during the humidification to prevent a decrease in comfort resulted from air exhaust from the central vent hole.

The controller 190 may determine whether the humidification function is in an active state when it is determined that the vehicle is in the parked or stopped state. The controller 190 may determine whether the water supply tank 105 is filled with the water when the humidification function is in an inactive state. The controller 190 may measure an amount of water (the water level) in the water supply tank 105 using the water level sensor installed in the water supply tank 105. The controller 190 may determine an operation mode of the humidification system as an evaporation drainage mode (a first mode) when the measured amount of water exceeds a preset reference value.

The controller 190 may determine whether the humidification function is active when the vehicle is traveling or parked or stopped. When the humidification function is in the active state, the controller 190 may determine whether the heating function is in the active state. When the heating function is in the active state, the controller 190 may measure the inside temperature through the sensors 160 and compare the measured inside temperature with a preset target inside temperature (a target temperature). When the measured inside temperature is lower than the target temperature, the controller 190 may determine the operation mode as a heating humidification mode (a second mode).

When the humidification function is active and the heating function is inactive while the vehicle is traveling or parked or stopped, the controller 190 may determine the operation mode as an ultrasonic humidification mode (a third mode). When the inside temperature measured while the humidification function and the heating function are activated in the state in which the vehicle is traveling or parked or stopped is equal to or higher than the target temperature, the controller 190 may determine the operation mode as a hybrid humidification mode (a fourth mode).

When the operation mode is determined as the first mode, the controller 190 may heat the water exhausted from the water supply tank 105 by operating the heating apparatus 140 to generate the water vapor. The water vapor vaporized by the heating apparatus 140 may be exhausted to the outside along the exhaust pipe.

The controller 190 may generate the water vapor by heating the water exhausted from the water supply tank 105 by operating the heating apparatus 140 when the operation mode is determined as the second mode. In addition, the controller 190 may control the valve 150 to allow the water vapor generated from the heating apparatus 140 to flow into the second duct 125 through the inlet pipe 145. In this connection, the controller 190 may adjust an amount of water vapor flowing into the second duct 125 by adjusting an opening amount of the valve 150. The water vapor flowed into the second duct 125 may humidify the dry air exhausted from the HVAC apparatus 115. The humidified air may be supplied into the vehicle along the second duct 125 to humidify the vehicle interior. As such, the controller 190 may provide heating-type humidification using the heating apparatus 140 in the second mode. That is, the heating apparatus 140 may operate as a heating humidifier (a second humidifier). The controller 190 may supply the dry air exhausted from the HVAC apparatus 115 through the first duct 120 to the window glass to prevent moisture generated on the window glass when operating in the second mode.

When the operation mode is determined as the third mode, the controller 190 may operate the humidification apparatus 130 to humidify the vehicle interior. The humidification apparatus 130 generates the water molecules (the water particles) using an ultrasonic wave under the control of the controller 190 and supplies the generated water molecules to the second duct 125, thereby adjusting the humidity of the vehicle interior. In addition, when the operation mode is determined as the fourth mode, the controller 190 may humidify the vehicle interior using the humidification apparatus 130 and the heating apparatus 140.

The controller 190 may execute smart humidification control logic stored in the memory when the operation mode is determined as the third mode or the fourth mode. To prevent the moisture (fogging) generated on the window glass during the humidification, the smart humidification control logic identifies an inside/outside air condition of the vehicle using the sensors 160 to enable control by linking the first duct 120 and the humidification function.

Specifically, the controller 190 may collect initial sensor data using the sensors 160. The controller 190 may measure the outside air temperature, the inside temperature, the window surface temperature, the inside humidity, the coolant temperature, and/or the vent temperature of the HVAC apparatus 115 using the AMB sensor, the in-car sensor, the ADS sensor, the humidity sensor, the WTS sensor, and/or the vent temperature sensor.

The controller 190 may determine a humidification function operation prohibition (a humidification function prohibition) based on the collected initial sensor data. The controller 190 may determine the humidification function operation prohibition in a case in which the inside relative humidity exceeds a critical humidity, in a case in which the outside air temperature is out of a critical temperature range, and in a case in which a situation such as a sensor failure (an error), a humidification function failure (an error), a heating wire failure, and/or lack of water in the humidifier, occurs. For example, when the inside temperature exceeds 30% and the inside absolute humidity exceeds is 90%, which exceeds a reference humidity, the controller 190 may determine that the inside humidification is unnecessary, and thus, determine the humidification function operation prohibition. Alternatively, when the outside air temperature is lower than −30° C., the controller 190 may determine that it is difficult for the humidification function to be operated normally because the outside air temperature is too low, thereby determining the humidification function operation prohibition. Alternatively, when use of a device essential for the operation of the humidification system, such as the sensors 160, the humidification apparatus 130, and/or the heating apparatus 140 is impossible because of a failure, an error, or the like thereof, the controller 190 may determine the humidification function operation prohibition. In addition, the controller 190 may determine the humidification function operation prohibition during blower off of the HVAC apparatus 115.

When the humidification function operation prohibition is determined, the controller 190 may output a guide phrase indicating the humidification function operation prohibition on the cluster without operating the humidification function. The controller 190 may also output a reason for the operation prohibition together when outputting the guide phrase indicating the humidification function operation prohibition.

When it is determined that the humidification function is able to be operated, the controller 190 may determine whether a vehicle temperature has become stable. The controller 190 may determine whether the vehicle temperature has become stable based on the coolant temperature and the vent temperature of the HVAC apparatus 115. For example, the controller 190 may determine that the vehicle temperature has become stable when the coolant temperature is equal to or higher than 80° C. or the vent temperature is equal to or higher than 35° C.

The controller 190 may start the humidification when the vehicle temperature has become stable. When the coolant temperature reaches 80° C. or the vent temperature reaches 35° C., the controller 190 may start (perform) proportional integral derivative (PID) control using the humidity sensor such that the inside humidity of the vehicle reaches a target relative humidity set by the user. The target relative humidity that may be set by the user may be limited in a range from 30% to 60%. The user is only able to set the target relative humidity, and is not able to identify the relative humidity that changes in real time. When the user selects automatic control, the controller 190 may perform the PID control to maintain the inside humidity of the vehicle at an optimum humidity amount, for example, in a range from 40% to 50%. The controller 190 may selectively perform the control based on an initial relative humidity rather than start the humidification unconditionally even when the operation mode enters a humidification on mode. For example, when the target relative humidity is higher than a current relative humidity, the controller 190 may immediately start the operation of the humidification function and perform target humidity maintenance cooperative control. When the current relative humidity is already higher than the target relative humidity, the controller 190 may perform target humidity maintenance cooperative control while maintaining the humidification function in a stationary state.

The controller 190 may compare the inside humidity with the preset target relative humidity (a target humidity) using the humidity sensor to determine whether the inside humidity reaches the target humidity. When the inside humidity reaches the target humidity, the controller 190 may perform the target humidity maintenance cooperative control such that the inside humidity maintains the target humidity.

The controller 190 may determine a humidification time point based on the inside temperature of the vehicle during the target humidity maintenance cooperative control. For example, when the inside relative humidity (the inside humidity) is higher than the target relative humidity (the target humidity) in a situation in which the inside temperature of the vehicle is lower than the target inside temperature (the target temperature), the controller 190 may wait until the inside humidity naturally decreases as the inside temperature of the vehicle rises, and may start the humidification from a time point at which a current inside humidity becomes lower than the target humidity.

As another example, when the inside temperature exceeds the target temperature, the controller 190 may operate an air conditioner to allow the inside temperature to reach the target temperature. The controller 190 may maintain a humidification stop state until the inside temperature reaches the target temperature. The controller 190 may start the humidification after the inside temperature reaches the target temperature. In addition, when the inside temperature is lowered to the target temperature only by inflow of the outside air, the controller 190 may start the humidification from a time point at which the inside temperature reaches 'target temperature+5° C.'.

As another example, when the inside temperature and the target temperature match, the controller 190 may adjust the humidification amount such that the inside humidity may maintain the target humidity.

As another example, when the target temperature is out of an appropriate temperature range (e.g., from 15 to 20° C.), the controller 190 may stop the humidification and output a notification notifying the humidification stop. For example, when the user manually set 'max warm' and 'blower max', the inside temperature may reach a temperature in a range from 30 to 40° C. or higher. Thus, when the inside humidity is controlled to be in the range from 40 to 50% or higher, the vehicle interior may become excessively hot and humid, so that the controller 190 may stop the humidification. In addition, when the user manually set 'max cool' and the 'blower max', or set 'FATC auto' and set the target temperature very low, dehumidification may occur by the cooling operation even when the humidification is performed, so that the controller 190 may stop the humidification.

When it is difficult to maintain the target humidity even when the humidification amount reaches the minimum or maximum, the controller 190 may allow the target humidity to be maintained through cooperative control with devices capable of adjusting the humidity. For example, when it is difficult to maintain the target humidity even when the humidification amount reaches the maximum, for example, when an inflow amount of the outside air is excessive, and thus, the dry air is excessively flowed to the interior, the controller 190 may increase a mixing amount of the inside air of an inlet door of the HVAC apparatus 115 that determines the inflow amount of the outside air while maintaining the maximum humidification amount, thereby performing control to follow the target humidity. In addition, the controller 190 may allow the target humidity to be followed by increasing and decreasing the humidification amount while minimizing the mixing amount of the inside air of the inlet of the HVAC apparatus 115.

As another example, when it is difficult to maintain the target humidity even when the humidification amount reaches the minimum or when the humidification is stopped, for example, when the humidification is not required and the dehumidification is required because the inside humidity is high, an outside air suction amount of the HVAC apparatus 115 may be set to 100%, and the air conditioner may be operated only when outside air suction control is not sufficient.

The controller 190 may determine whether a situation in which the target humidity and/or a target surface temperature are not able to be maintained has occurred. When the situation in which the target humidity and/or the target surface temperature are not able to be maintained occurs, the controller 190 may output a notification for notifying the situation and stop the humidification operation. In addition, the controller 190 may stop the humidification operation when receiving data indicating that the humidification function is off from the user input device 170.

Figure 2:
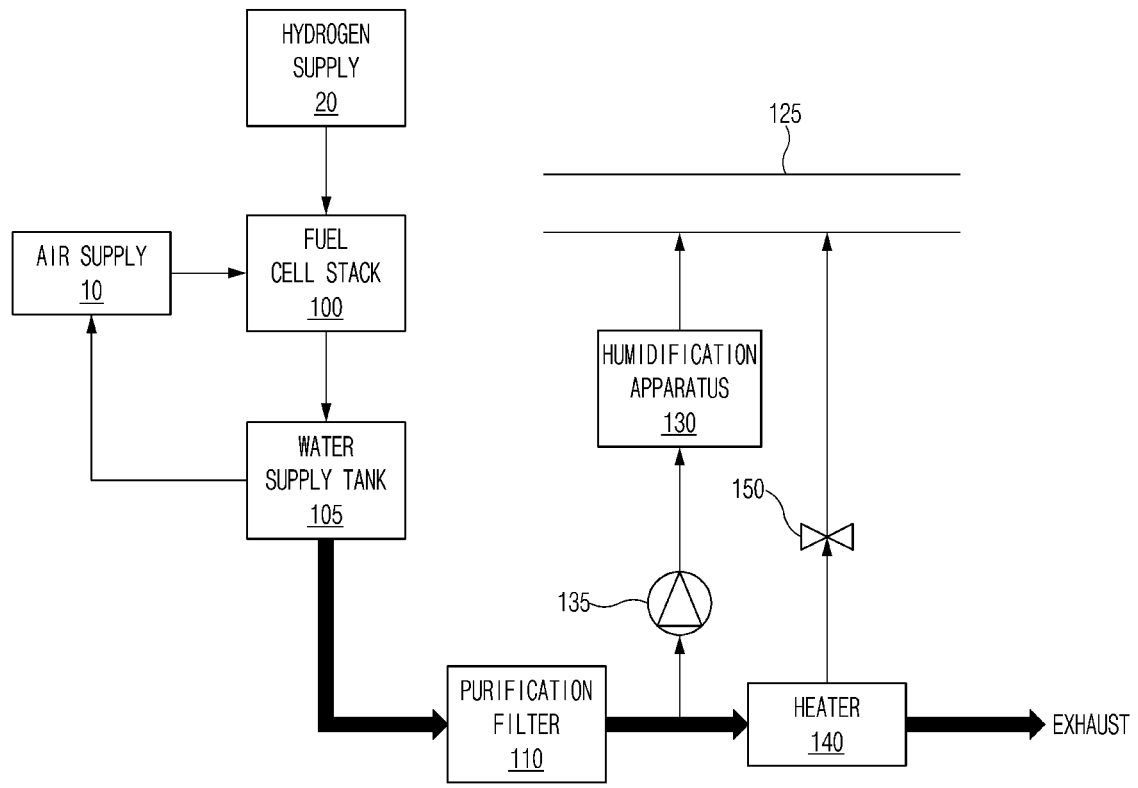
FIG. 2 is a view for illustrating a first mode of a humidification system according to embodiments of the present disclosure.

FIG. 2 is a view for illustrating a first mode of a humidification system according to embodiments of the present disclosure.

Referring to FIG. 2, when the operation mode of the humidification system is determined as the first mode, that is, the evaporation drainage mode, the water supply tank 105 may exhaust the water stored in the water supply tank 105 in response to an instruction of the controller 190. When the water supply tank 105 exhausts the stored water, the controller 190 may operate the purification filter 110 and the heating apparatus 140.

The purification filter 110 may purify the water exhausted from the water supply tank 105 and supply the purified water to the heating apparatus 140. The heating apparatus 140 may heat the water introduced through the purification filter 110 to vaporize the water into the water vapor. The vaporized gas, that is, the water vapor may be exhausted from the heating apparatus 140 to the outside along the exhaust pipe.

The controller 190 may operate the heating apparatus 140 until all the water stored in the water supply tank 105 is exhausted. The controller 190 may determine whether all of the water in the water supply tank 105 is exhausted using the water level sensor of the water supply tank 105. The heating apparatus 140 may evaporate all the water in the water supply tank 105 and exhaust the water to the outside. As described above, because the water generated from the fuel cell stack 100 is vaporized and exhausted to the outside using the heating apparatus 140, it is possible to ameliorate a phenomenon in which water drops to a region below the vehicle during the parking or the stopping.

Figure 3:
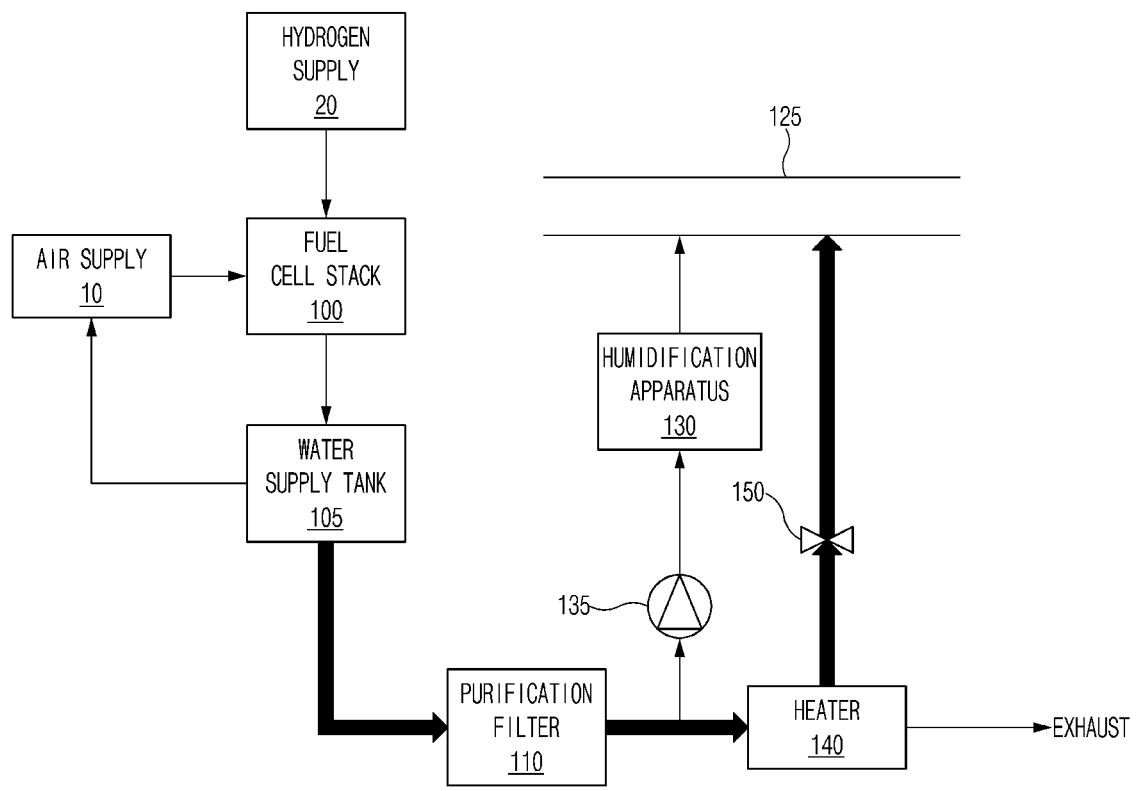
FIG. 3 is a view for illustrating a second mode of a humidification system according to embodiments of the present disclosure.

FIG. 3 is a view for illustrating a second mode of a humidification system according to embodiments of the present disclosure.

Referring to FIG. 3, when the operation mode of the humidification system is determined as the second mode, that is, the heating humidification mode, the water supply tank 105 may exhaust the water collected therein. The controller 190 may operate the purification filter 110, the heating apparatus 140, and the valve 150 when the water stored in the water supply tank 105 is exhausted.

The purification filter 110 may purify the water exhausted from the water supply tank 105 and supply the purified water to the heating apparatus 140. The heating apparatus 140 may generate the water vapor by heating the water purified by the purification filter 110, and may supply the generated water vapor to the second duct 125. The water vapor (the vaporized gas) output from the heating apparatus 140 may flow to the second duct 125.

The HVAC apparatus 115 may exhaust the dry air to the second duct 125 by operating the motor 1151. The dry air supplied to the second duct 125 may be humidified by the water vapor supplied from the heating apparatus 140 and supplied into the vehicle interior. The controller 190 may adjust a flow rate of water vapor (that is, a moisture amount) supplied to the second duct 125 by adjusting an opening rate of the valve 150. In addition, the HVAC apparatus 115 may exhaust the dry air to the first duct 120 to prevent the moisture from being generated on the window glass.

Figure 4:
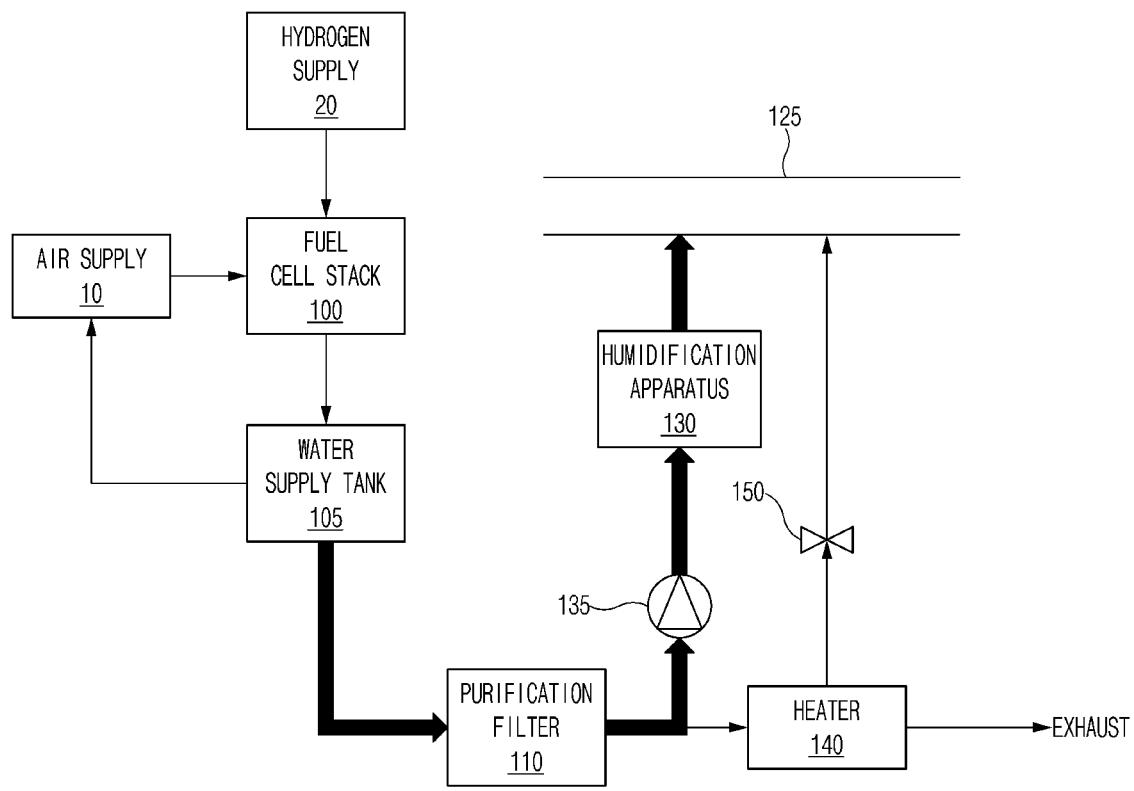
FIG. 4 is a view for illustrating a third mode of a humidification system according to embodiments of the present disclosure.

FIG. 4 is a view for illustrating a third mode of a humidification system according to embodiments of the present disclosure.

Referring to FIG. 4, when the operation mode of the humidification system is determined as the third mode, that is, the ultrasonic humidification mode, the controller 190 may operate the purification filter 110, the humidification apparatus 130, and the pump 135 while exhausting the water stored in the water supply tank 105.

The purification filter 110 may purify the water exhausted from the water supply tank 105. The pump 135 may pump the water purified by the purification filter 110 and supply the purified water to the water trap 1301 in the humidification apparatus 130. That is, the pump 135 may supply the water to the humidification apparatus 130 which is the ultrasonic humidifier. The humidification apparatus 130 may operate the ultrasonic generator 1302 to apply the ultrasonic wave to the water in the water trap 1301 to cause a vibration, and the water may be decomposed into the water molecules (the water particles) by such vibration. The decomposed water molecules may move to the second duct 125. In other words, the controller 190 may operate the ultrasonic generator 1302 to decompose the water in the water trap 1301, thereby humidifying the vehicle interior. When operating in the third mode, the controller 190 may operate the motor 1151 of the HVAC apparatus 115 to exhaust the dry air to the first duct 120, thereby preventing the moisture from being generated on the window.

Figure 5:
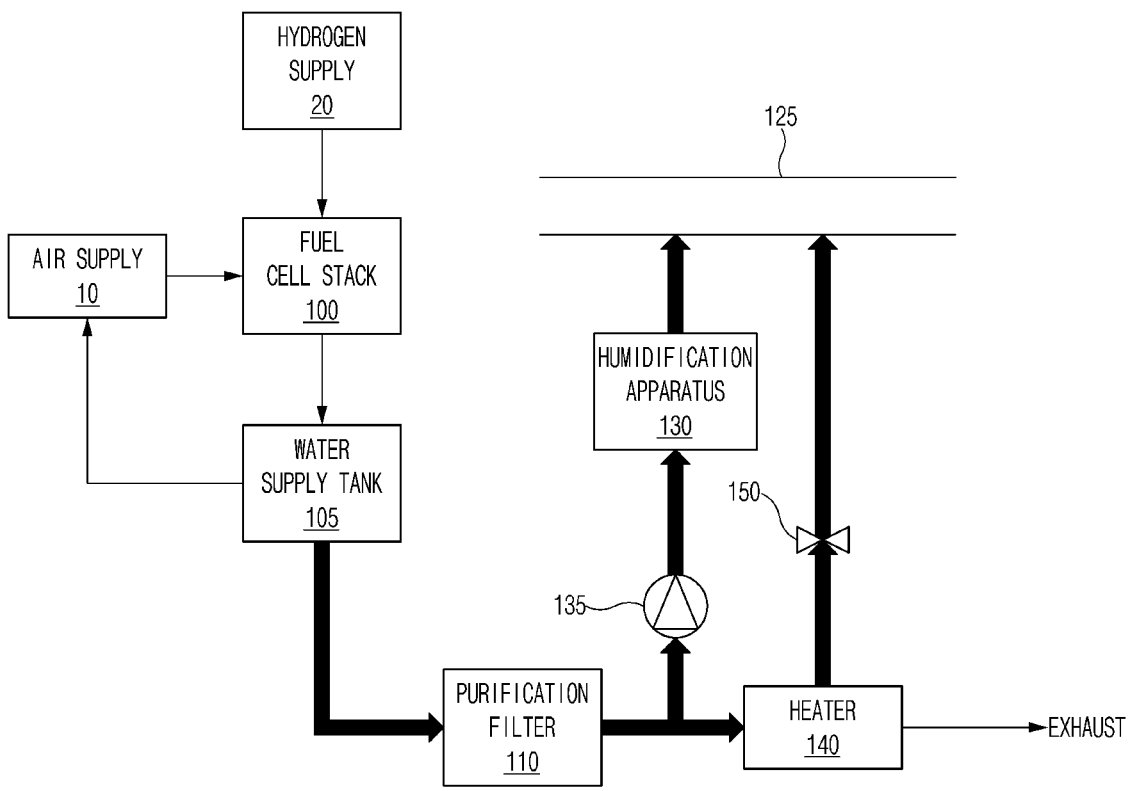
FIG. 5 is a view for illustrating a fourth mode of a humidification system according to embodiments of the present disclosure.

FIG. 5 is a view for illustrating a fourth mode of a humidification system according to embodiments of the present disclosure.

Referring to FIG. 5, when the operation mode of the humidification system is determined as the fourth mode, that is, the hybrid humidification mode, the controller 190 may operate the purification filter 110, the humidification apparatus 130, the pump 135, the heating apparatus 140, and the valve 150 while exhausting the water stored in the water supply tank 105.

The water supply tank 105 may exhaust the water stored therein under the control of the controller 190. The purification filter 110 may purify the water exhausted from the water supply tank 105. The heating apparatus 140 may heat and vaporize the water purified by the purification filter 110. The controller 190 may control an opening degree of the valve 150 to allow the water vapor vaporized by the heating apparatus 140 to flow to the second duct 125.

In addition, the controller 190 may supply the purified water to the water trap 1301 of the humidification apparatus 130 by operating the pump 135. The controller 190 may operate the ultrasonic generator 1302 in the water trap 1301 to decompose the water in the water trap 1301.

The controller 190 may operate the motor 1151 to generate a wind and the dry air may flow to the first duct 120 and the second duct 125 by such wind. In addition, the controller 190 may supply the moisture to the second duct 125 by simultaneously operating the humidification apparatus 130 and the heating apparatus 140. The controller 190 may humidify the dry air passing through the second duct 125 using the humidification apparatus 130 and the heating apparatus 140 to supply the humidified air into the vehicle interior. In this connection, the controller 190 may set a ratio between a heating-type humidification amount and an ultrasonic-type humidification amount based on a user input received from the user input device 170. When the humidification amount ratio is not selected by the user, the controller 190 may adjust the heating-type humidification amount and the ultrasonic-type humidification amount based on a preset default ratio (e.g., 1:5). In addition, when the humidification amount ratio is not selected (set) by the user, the controller 190 may adjust the ratio in consideration of the inside temperature and an inside target temperature (or an inside appropriate temperature). For example, a ratio of the heating-type humidification amount may be increased when the inside temperature is lower than the inside target temperature (or the inside appropriate temperature), and a ratio of the ultrasonic-type humidification amount may be increased when the inside temperature is higher than the inside target temperature (or the inside appropriate temperature).

The controller 190 may prevent the moisture from being generated on the window by exhausting the dry air to the first duct 120 when operating in the fourth mode.

Figure 6:
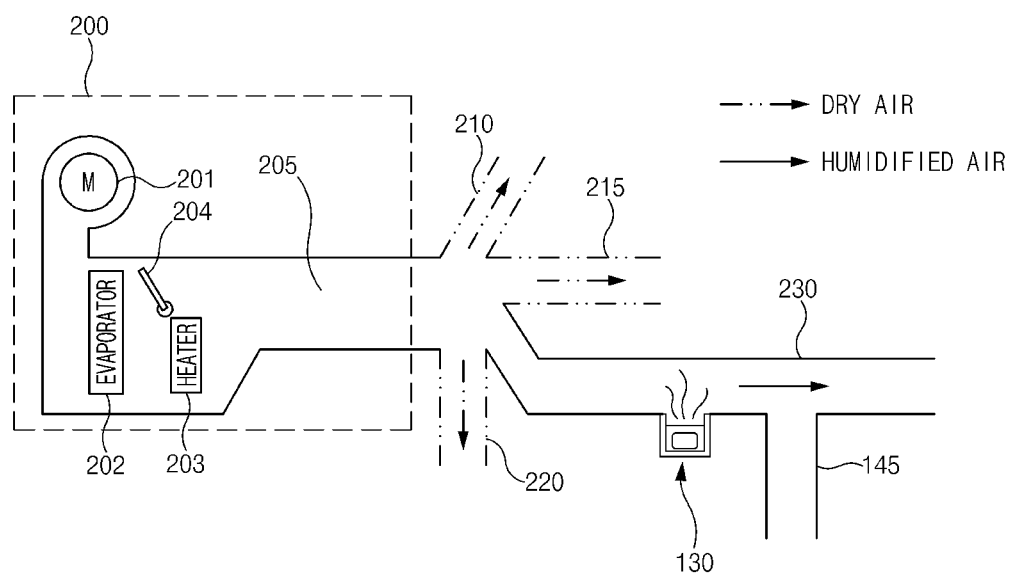
FIG. 6 is a view showing a duct structure of a humidification system according to a first embodiment of the present disclosure.

FIG. 6 is a view showing a duct structure of a humidification system according to a first embodiment of the present disclosure.

An HVAC apparatus 200 may drive the fan of the blower using a motor 201 to blow the outside air and/or the inside air into the vehicle interior. In addition, the HVAC apparatus 200 may control opening and closing of a temp door 204 to exhaust air cooled by an evaporator 202 or air heated by a heater 203 through a vent 205.

A first air duct 210, a second air duct 215, a third air duct 220, and a fourth air duct 230 may be connected to the vent 205 of the HVAC apparatus 200. The first air duct 210 may be a defrost (DEF) duct that guides the dry air exhausted from the HVAC apparatus 200 to the wind shield glass and/or a demist (DEM) duct that guides the dry air exhausted from the HVAC apparatus 200 to the side glass located on each of front left and right sides of the vehicle interior. The second air duct 215 may be a side vent duct that guides the dry air exhausted from the vent 205 to be exhausted at a vertical level of a shoulder of a passenger on each of left and right sides of the vehicle interior. The third air duct 220 may be a floor (FLR) duct disposed to guide the dry air exhausted from the vent 205 to a floor of the vehicle interior, for example, to feet portions of a driver's seat and a passenger's seat. The fourth air duct 230 may exhaust the dry air exhausted from the HVAC apparatus 200 at a vertical level of a shoulder of a passenger through the vent hole installed at the center of the vehicle interior. The fourth air duct 230 may humidify the dry air using the water particles generated from the humidification apparatus 130 and/or the water vapor introduced through the inlet pipe 145 (that is, the water vapor vaporized by the heating apparatus 140).

As described above, the first air duct 210, the second air duct 215, and/or the third air duct 220 may provide passages for transporting the dry air, and the fourth air duct 230 may provide a passage for transporting the humidified air.

The above embodiment discloses that the component for humidifying the dry air is applied to the fourth air duct 230, but the present disclosure may not be limited thereto, and the component for humidifying the dry air may be implemented to be applied to the third air duct 220. In other words, the third air duct 220 may be implemented to humidify the dry air using the water particles generated from the humidification apparatus 130 and/or the water vapor introduced through the inlet pipe 145 (that is, the water vapor vaporized by the heating apparatus 140).

Figure 7:
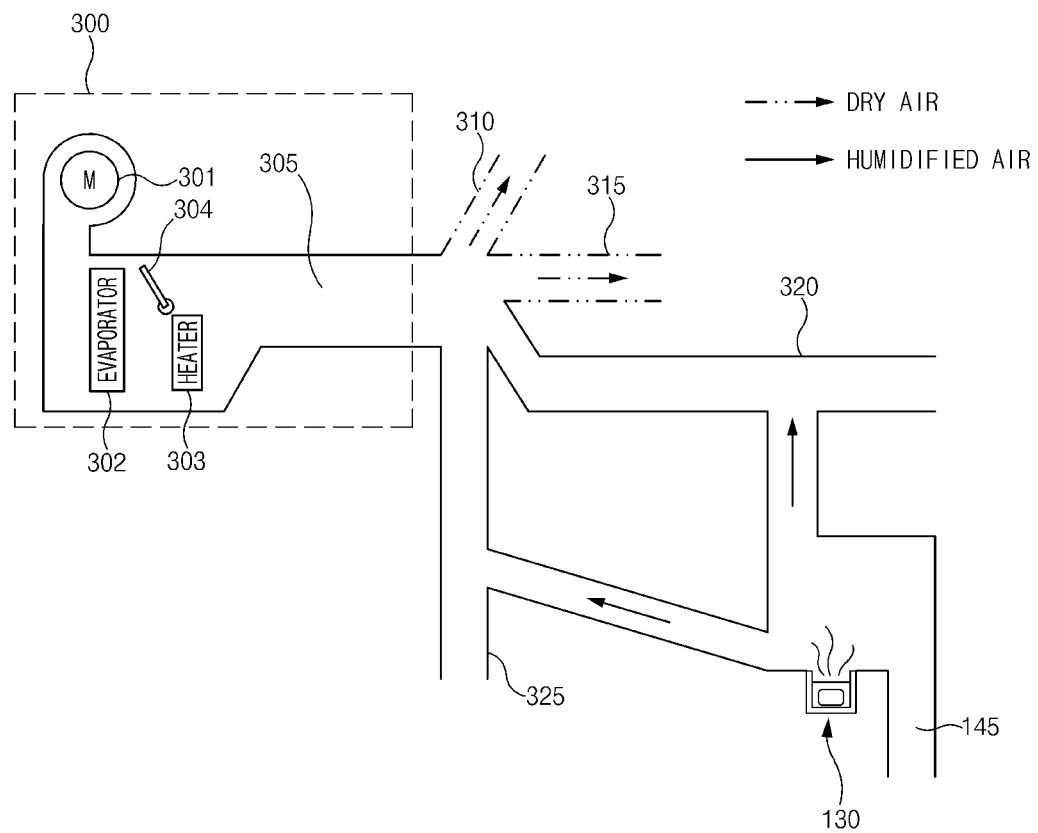
FIG. 7 is a view showing a duct structure of a humidification system according to a second embodiment of the present disclosure.

FIG. 7 is a view showing a duct structure of a humidification system according to a second embodiment of the present disclosure.

An HVAC apparatus 300 may drive the blower fan using a motor 301 to blow the outside air and/or the inside air into the vehicle interior. In addition, the HVAC apparatus 300 may control opening and closing of a temp door 304 to exhaust air cooled by an evaporator 302 or air heated by a heater 303 through a vent 305.

A first air duct 310, a second air duct 315, a third air duct 320, and a fourth air duct 325 may be connected to the vent 305 of the HVAC apparatus 300. The first air duct 310 may blow the dry air exhausted from the HVAC apparatus 300 in a direction of the wind shield glass and/or the side glass of the vehicle. The second air duct 315 may exhaust the dry air exhausted from the HVAC apparatus 300 at a vertical level of a shoulder of the driver's seat and the passenger's seat. In the third air duct 320 and the fourth air duct 325, passages to which the water particles generated from the humidification apparatus 130 and/or the water vapor introduced through the inlet pipe 145 (that is, the water vapor vaporized by the heating apparatus 140) are introduced may be defined. The third air duct 320 and the fourth air duct 325 may humidify the dry air using the water vapor (the water particles) introduced through the humidification apparatus 130 and the inlet pipe 145. The third air duct 320 and the fourth air duct 325 may exhaust the humidified air toward a center and a floor of a first seat row of the vehicle interior.

Figure 8:
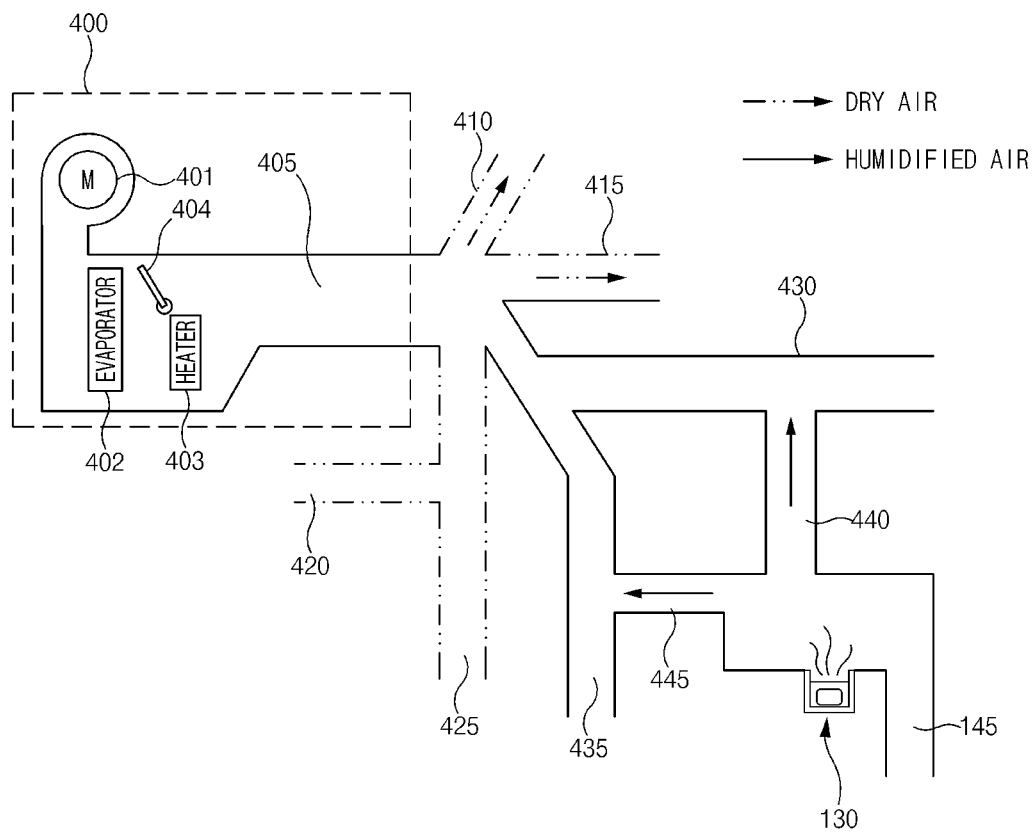
FIG. 8 is a view showing a duct structure of a humidification system according to a third embodiment of the present disclosure.

FIG. 8 is a view showing a duct structure of a humidification system according to a third embodiment of the present disclosure.

An HVAC apparatus 400 may drive the blower fan using a motor 401 to blow the outside air and/or the inside air into the vehicle interior. In addition, the HVAC apparatus 400 may control opening and closing of a temp door 404 to exhaust air cooled by an evaporator 402 or air heated by a heater 403 through a vent 405.

A first air duct 410, a second air duct 415, a third air duct 420, a fourth air duct 425, a fifth air duct 430, and a sixth air duct 435 may be connected to the vent 405 of the HVAC apparatus 400. The first air duct 410 may blow the dry air exhausted from the HVAC apparatus 400 in the direction of the wind shield glass and/or the side glass of the vehicle. The second air duct 415 may exhaust the dry air exhausted from the HVAC apparatus 400 at the vertical level of the shoulder of the driver's seat and the passenger's seat. The third air duct 420 and the fourth air duct 425 may exhaust the dry air exhausted from the HVAC apparatus 400 toward a floor of a second seat row (that is, a rear seat) and a floor of the first seat row (that is, the driver's seat and the passenger's seat) of the vehicle, respectively. The fifth air duct 430, which is a center vent duct (CTR vent duct), may guide the air exhausted from the HVAC apparatus 400 at a vertical level of a shoulder of a passenger at the center of the vehicle interior. The sixth air duct 435, which is a rear vent duct (RR vent duct), may guide the air exhausted from the HVAC apparatus 400 in a direction of a rear seat console vent. In the fifth air duct 430 and the sixth air duct 435, passages to which the water particles generated from the humidification apparatus 130 and/or the water vapor introduced through the inlet pipe 145 (that is, the water vapor vaporized by the heating apparatus 140) are introduced, that is, humidification lines 440 and 445 may be defined, respectively. The fifth air duct 430 and the sixth air duct 435 may humidify the dry air exhausted from the HVAC apparatus 400 using the moisture introduced through the humidification apparatus 130 and the inlet pipe 145.

Figure 9:
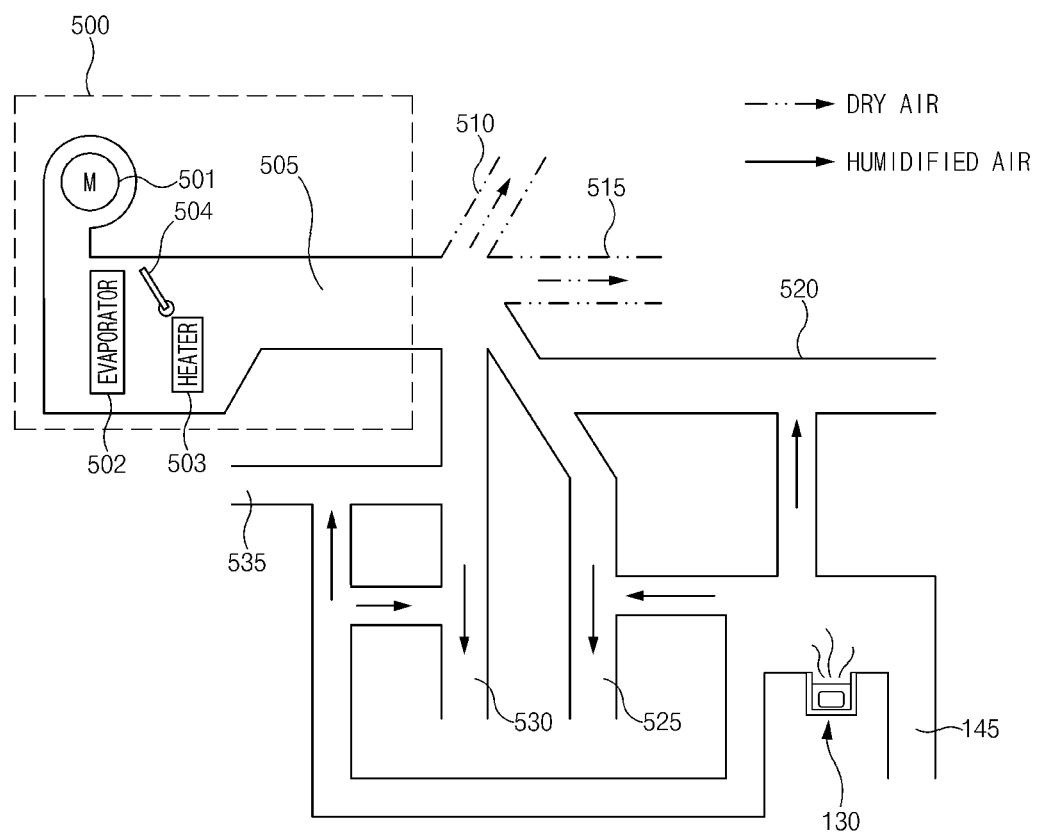
FIG. 9 is a view showing a duct structure of a humidification system according to a fourth embodiment of the present disclosure.

FIG. 9 is a view showing a duct structure of a humidification system according to a fourth embodiment of the present disclosure.

An HVAC apparatus 500 may drive the blower fan using a motor 501 to blow the outside air and/or the inside air into the vehicle interior. In addition, the HVAC apparatus 500 may control opening and closing of a temp door 504 to exhaust air cooled by an evaporator 502 or air heated by a heater 503 through a vent 505.

A first air duct 510, a second air duct 515, a third air duct 520, a fourth air duct 525, a fifth air duct 530, and a sixth air duct 535 may be connected to the vent 505 of the HVAC apparatus 500. The first air duct 510 may blow the dry air exhausted from the HVAC apparatus 500 in the direction of the wind shield glass and/or the side glass of the vehicle. The second air duct 515 may exhaust the dry air exhausted from the HVAC apparatus 500 at the vertical level of the shoulder of the driver's seat and the passenger's seat. The third air duct 520 may guide the air exhausted from the HVAC apparatus 500 at the vertical level of the shoulder of the passenger at the center of the vehicle interior. The fourth air duct 525 may guide the air exhausted from the HVAC apparatus 500 in the direction of the rear seat console vent. The fifth air duct 530 may exhaust the dry air exhausted from the HVAC apparatus 500 toward the floor of the first seat row (that is, the driver's seat and the passenger's seat) of the vehicle. The sixth air duct 535 may exhaust the dry air exhausted from the HVAC apparatus 500 toward the floor of the second seat row (that is, the rear seat). In the third air duct 520 to the sixth air duct 535, passages to which the water particles generated from the humidification apparatus 130 and/or the water vapor introduced through the inlet pipe 145 (that is, the water vapor vaporized by the heating apparatus 140) are introduced may be defined. The third air duct 520 to the sixth air duct 535 may humidify the dry air exhausted from the HVAC apparatus 500 using the water vapor (the water particles) introduced through the humidification apparatus 130 and the inlet pipe 145.

Figure 10:
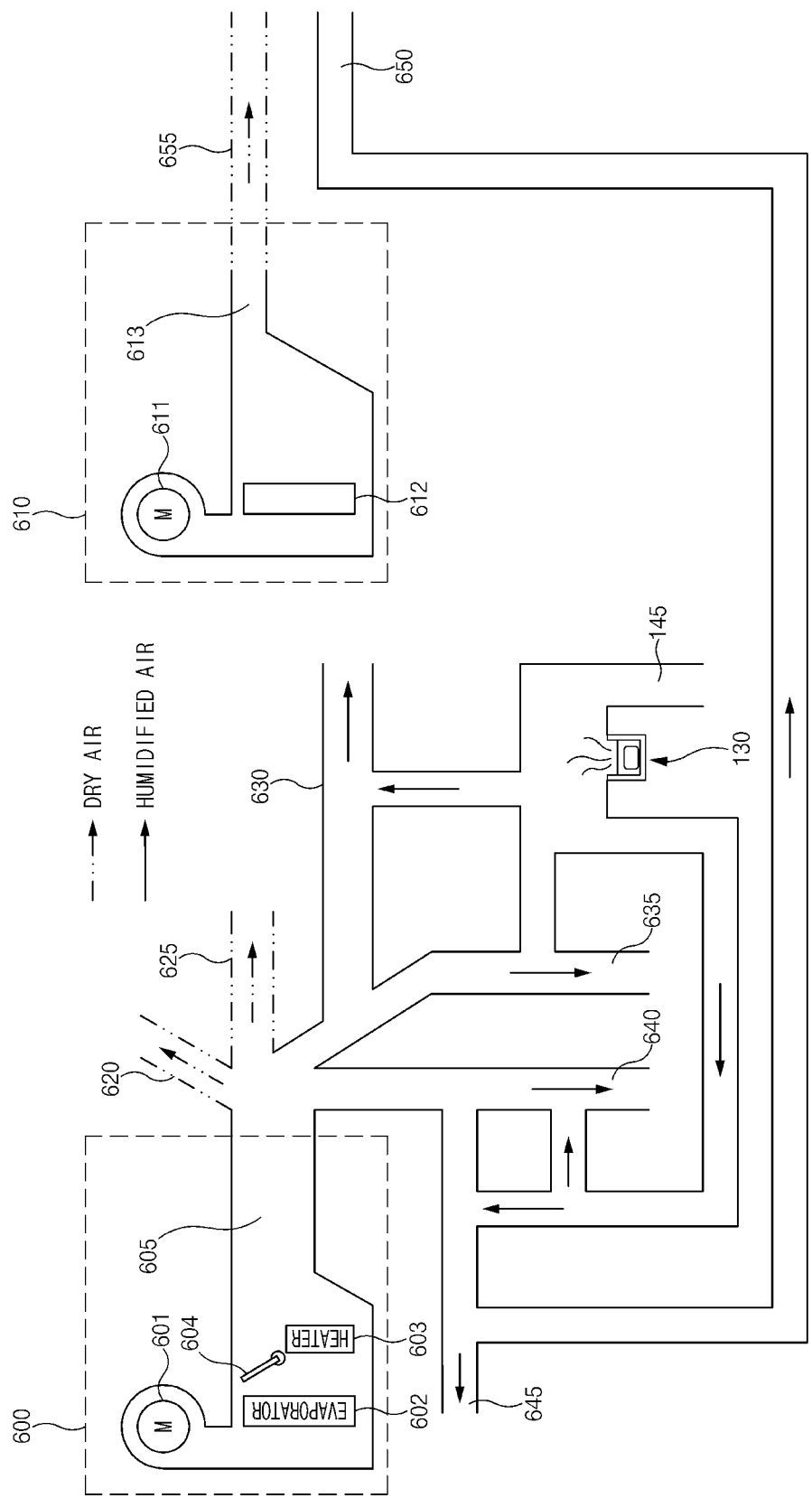
FIG. 10 is a view showing a duct structure of a humidification system according to a fifth embodiment of the present disclosure.

FIG. 10 is a view showing a duct structure of a humidification system according to a fifth embodiment of the present disclosure.

A humidification system may include a first HVAC apparatus 600 and a second HVAC apparatus 610. The first HVAC apparatus 600 may drive the blower fan using a motor 601 to blow the outside air and/or the inside air into the vehicle interior. In addition, the first HVAC apparatus 600 may control opening and closing of a temp door 604 to exhaust air cooled by an evaporator 602 or air heated by a heater 603 through a vent 605. The second HVAC apparatus 610 may drive the blower fan using a motor 611 to blow the outside air and/or the inside air into the vehicle interior. The second HVAC apparatus 610 may exhaust air cooled by an evaporator 612 through a vent 613.

A first air duct 620, a second air duct 625, a third air duct 630, a fourth air duct 635, a fifth air duct 640, and a sixth air duct 645 may be connected to the vent 605 of the first HVAC apparatus 600. The first air duct 620 may blow the dry air exhausted from the first HVAC apparatus 600 in the direction of the wind shield glass and/or the side glass of the vehicle. The second air duct 625 may exhaust the dry air exhausted from the first HVAC apparatus 600 at the vertical level of the shoulder of the driver's seat and the passenger's seat. The third air duct 630 may guide the air exhausted from the first HVAC apparatus 600 at the vertical level of the shoulder of the passenger at the center of the vehicle interior. The fourth air duct 635 may guide the air exhausted from the first HVAC apparatus 600 in the direction of the rear seat console vent. The fifth air duct 640 may exhaust the dry air exhausted from the first HVAC apparatus 600 toward the floor of the first seat row (that is, the driver's seat and the passenger's seat) of the vehicle. The sixth air duct 645 may exhaust the thy air exhausted from the first HVAC apparatus 600 toward the floor of the second seat row (that is, the rear seat). In the third air duct 630 to the sixth air duct 645, passages to which the water particles generated from the humidification apparatus 130 and/or the water vapor introduced through the inlet pipe 145 (that is, the water vaporized by the heating apparatus 140) are introduced may be defined. The third air duct 630 to the sixth air duct 645 may humidify the dry air exhausted from the first HVAC apparatus 600 using the water vapor (the water particles) introduced through the humidification apparatus 130 and the inlet pipe 145.

In addition, a seventh air duct 650 may be connected to the sixth air duct 645. The seventh air duct 650 may guide the air exhausted from the first HVAC apparatus 600 toward a floor of a third seat row of the vehicle. In addition, the sixth air duct 645 may exhaust the air humidified by the moisture introduced through the humidification apparatus 130 and the inlet pipe 145 toward the floor of the third seat row of the vehicle.

An eighth air duct 655 may be connected to the vent 613 of the second HVAC apparatus 610. The eighth air duct 655 may guide the dry air exhausted from the second HVAC apparatus 610 to the third seat row of the vehicle.

Figure 11:
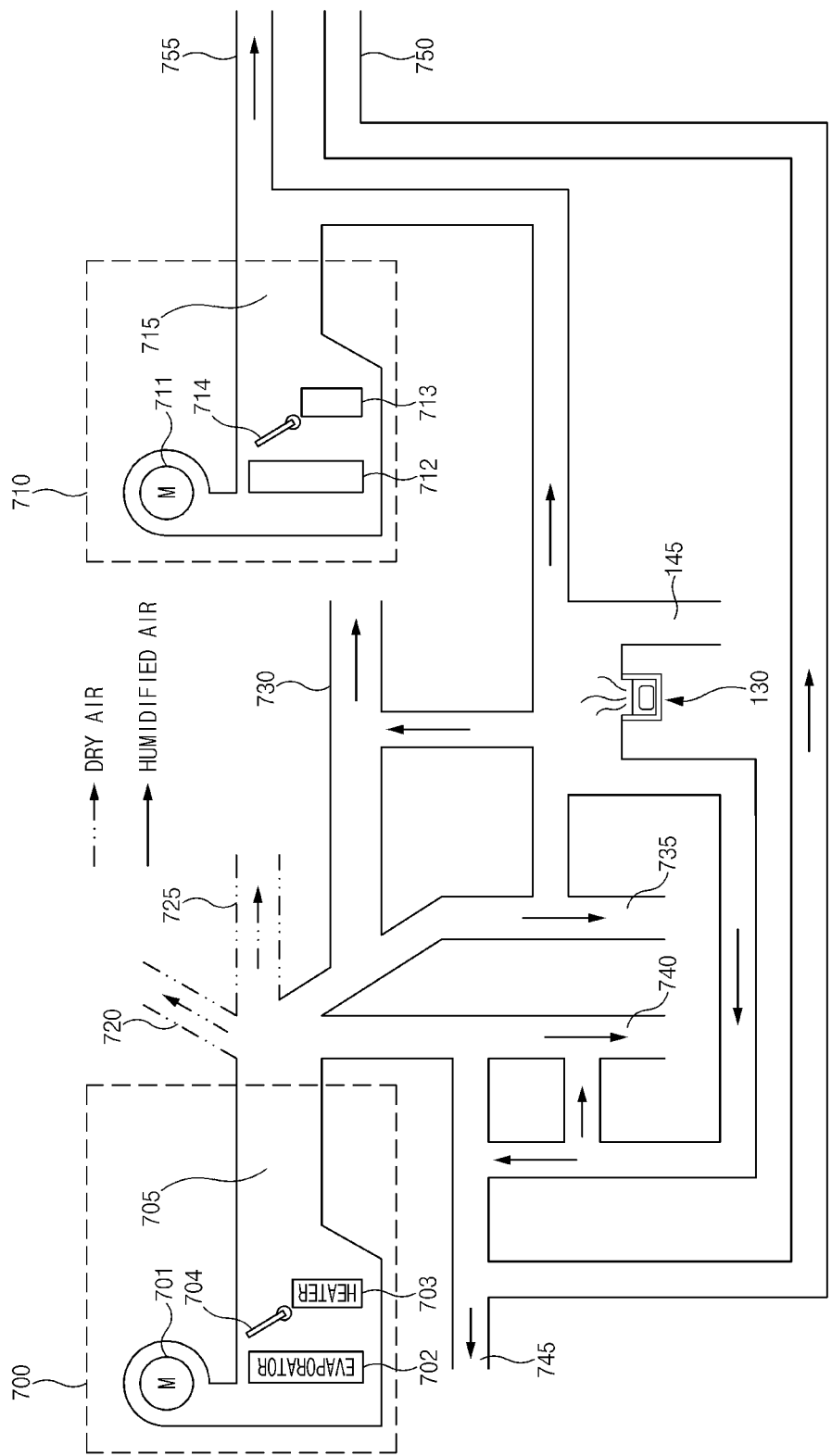
FIG. 11 is a view showing a duct structure of a humidification system according to a sixth embodiment of the present disclosure.

FIG. 11 is a view showing a duct structure of a humidification system according to a sixth embodiment of the present disclosure.

A humidification system may include a first HVAC apparatus 700 and a second HVAC apparatus 710. The first and second HVAC apparatuses 700 and 710 may drive the blower fan using motors 701 and 711 to blow the outside air and/or the inside air into the vehicle interior, respectively. The first and second HVAC apparatuses 700 and 710 may control opening and closing of temp doors 704 and 714 to exhaust air cooled by evaporators 702 and 712 or air heated by heaters 703 and 713 through vents 705 and 715, respectively.

A first air duct 720, a second air duct 725, a third air duct 730, a fourth air duct 735, a fifth air duct 740, a sixth air duct 745, and a seventh air duct 750 may be connected to the vent 705 of the first HVAC apparatus 700. The first air duct 720 may blow the dry air exhausted from the first HVAC apparatus 700 in the direction of the wind shield glass and/or the side glass of the vehicle. The second air duct 725 may exhaust the dry air exhausted from the first HVAC apparatus 700 at the vertical level of the shoulder of the driver's seat and the passenger's seat. The third air duct 730 may guide the air exhausted from the first HVAC apparatus 700 at the vertical level of the shoulder of the passenger at the center of the vehicle interior. The fourth air duct 735 may guide the air exhausted from the first HVAC apparatus 700 in the direction of the rear seat console vent. The fifth air duct 740 may exhaust the thy air exhausted from the first HVAC apparatus 700 toward the floor of the first seat row (that is, the driver's seat and the passenger's seat) of the vehicle. The sixth air duct 745 may exhaust the dry air exhausted from the first HVAC apparatus 700 toward the floor of the second seat row (that is, the rear seat). The seventh air duct 750 may guide the air exhausted from the first HVAC apparatus 700 toward the floor of the third seat row of the vehicle. In the third air duct 730 to the seventh air duct 750, passages to which the water particles generated from the humidification apparatus 130 and/or the water vapor introduced through the inlet pipe 145 (that is, the water vapor vaporized by the heating apparatus 140) are introduced may be defined. The third air duct 730 to the seventh air duct 750 may humidify the dry air exhausted from the first HVAC apparatus 700 using the water vapor (the water particles) introduced through the humidification apparatus 130 and the inlet pipe 145. That is, the third air duct 730 to the seventh air duct 750 may exhaust the air humidified by the moisture introduced through the humidification apparatus 130 and the inlet pipe 145.

An eighth air duct 755 may be connected to the vent 715 of the second HVAC apparatus 710. The eighth air duct 755 may guide the dry air exhausted from the second HVAC apparatus 710 to the third seat row of the vehicle. In addition, the eighth air duct 755 may exhaust the air humidified by the moisture introduced through the humidification apparatus 130 and the inlet pipe 145 to the third seat row of the vehicle.

Figure 12:
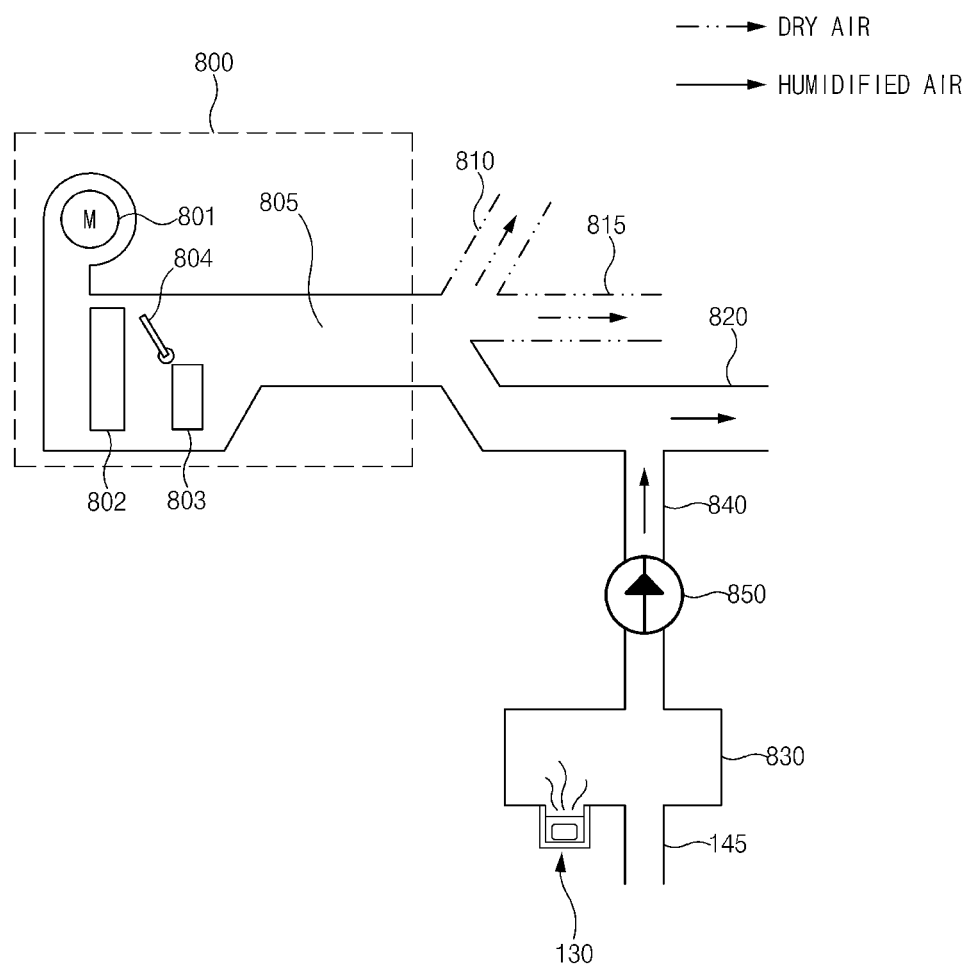
FIG. 12 is a view showing a duct structure of a humidification system according to a seventh embodiment of the present disclosure.

FIG. 12 is a view showing a duct structure of a humidification system according to a seventh embodiment of the present disclosure.

An HVAC apparatus 800 may drive the blower fan using a motor 801 to blow the outside air and/or the inside air into the vehicle interior. In addition, the HVAC apparatus 800 may control opening and closing of a temp door 804 to exhaust air cooled by an evaporator 802 or air heated by a heater 803 through a vent 805.

A first air duct 810, a second air duct 815, and a third air duct 820 may be connected to the vent 805 of the HVAC apparatus 800. The first air duct 810 may blow the thy air exhausted from the HVAC apparatus 800 in the direction of the wind shield glass and/or the side glass of the vehicle. The second air duct 815 may exhaust the dry air exhausted from the HVAC apparatus 800 at the vertical level of the shoulder of the driver's seat and the passenger's seat. The third air duct 820 may guide the air exhausted from the HVAC apparatus 800 to the center of the vehicle interior, the rear seat console vent, the rear seat floor, the third row floor, and/or a third row console vent. A humidification line 840 connected to a moisture supply 830 may be formed in the third air duct 820. The moisture supply 830 may supply the water particles generated from the humidification apparatus 130 and/or the water vapor introduced through the inlet pipe 145, that is, the water vapor vaporized by the heating apparatus 140 through the humidification line 840 into the third air duct 820. A check valve 850 may be mounted on the humidification line 840. The check valve 850, which is a one-way valve, may be opened when the humidification system is operated and closed when the humidification system is not operated. Although there is no risk of the moisture flowing back into the HVAC apparatus 800 when the blower is operating the moisture remaining in the humidification line 840 may be introduced into the HVAC apparatus 800 based on a change of an inside flow when the blower is not operated (off), so that the moisture remaining in the humidification line 840 may be prevented from flowing into the HVAC apparatus 800 by controlling the check valve 850.

Figure 13:
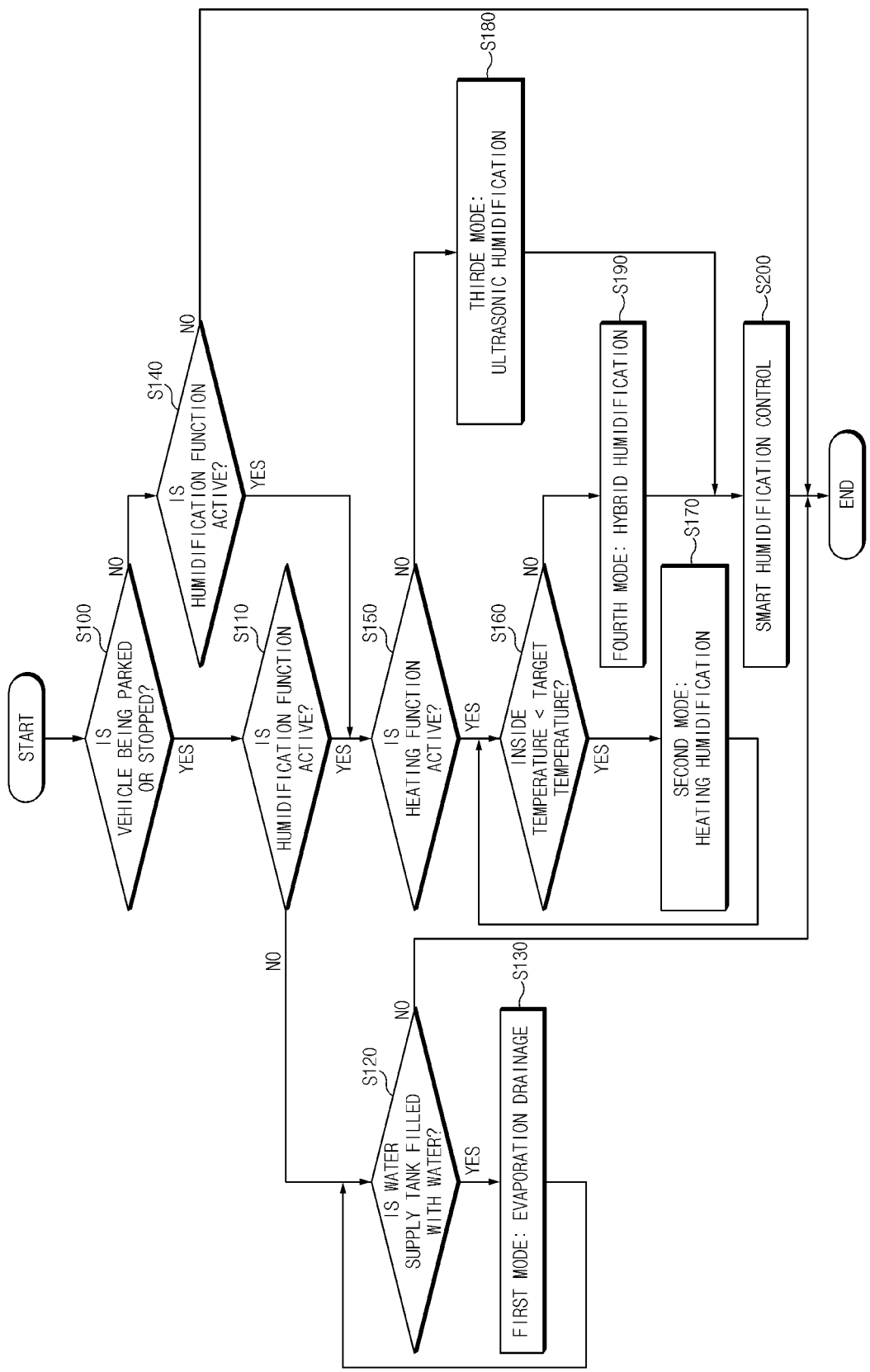
FIG. 13 is a flowchart illustrating a humidification method of a fuel cell electric vehicle according to embodiments of the present disclosure.

FIG. 13 is a flowchart illustrating a humidification method of a fuel cell electric vehicle according to embodiments of the present disclosure.

The controller 190 may determine whether the vehicle is being parked or stopped (S100). The controller 190 may determine whether the vehicle is being parked or stopped in the situation in which the power is supplied to the vehicle (e.g., the accessory power on state or the vehicle power on state). In other words, the controller 190 may determine whether the vehicle is being parked or stopped based on state information of the start button and the shift stage. For example, when the start button is in the accessory power on state and the shift stage is the "P" stage, the controller 190 may determine that the vehicle is 'being parked or stopped'.

The controller 190 may determine whether the humidification function is active when the vehicle is being parked or stopped (S110). The controller 190 may determine whether the humidification function is active based on a state of a humidification button of the user input device 170. For example, the controller 190 may determine that the humidification function is in the active state when the humidification button is pressed, and the controller 190 may determine that the humidification function is in the inactive state when the humidification button is not pressed.

The controller 190 may determine whether the water supply tank 105 is filled with the water when the humidification function is the inactive state (S120). When the humidification function is identified to be in the inactive state while the vehicle is being parked or stopped in the accessory power on state or in the vehicle power on state, the controller 190 may measure the amount of water (the water level) stored in the water supply tank 105 using the water level sensor installed in the water supply tank 105. The controller 190 may compare the measured amount of water with the predetermined reference value, and determine that the water supply tank 105 is filled with the water when the measured amount of water exceeds the reference value.

When the water supply tank 105 is filled with the water, the controller 190 may determine the operation mode of the humidification system as the first mode, that is, the evaporation drainage mode (S130). When the operation mode is determined as the first mode, the controller 190 may supply the water stored in the water supply tank 105 to the heating apparatus 140 while operating the heating apparatus 140. The heating apparatus 140 may heat the water supplied from the water supply tank 105 under the control of the controller 190 to exhaust the vaporized water vapor to the outside. The controller 190 may operate the heating apparatus 140 until all the water stored in the water supply tank 105 is exhausted. The controller 190 may continuously check the water level of the water supply tank 105 through the water level sensor of the water supply tank 105. When the water level of the water supply tank 105 is lowered to a vertical level equal to or lower than a preset reference water level, the controller 190 may stop the evaporation drainage using the heating apparatus 140.

When it is determined in S100 that the vehicle is not being parked or stopped, the controller 190 may determine whether the humidification function is active (S140). In other words, the controller 190 may determine whether the humidification function is active even when the vehicle is traveling.

When it is identified in S110 or S140 that the humidification function is in the active state, the controller 190 may determine whether the heating function is active (S150). The controller 190 may determine whether the heating function operates based on whether a heating button of the user input device 170 is manipulated. The controller 190 may determine that the heating function is in the active state when the heating button is manipulated, and may determine that the heating function is in the inactive state when the heating button is not manipulated.

When the heating function is in the active state, the controller 190 may determine whether the inside temperature is lower than the target temperature (S160). The controller 190 may measure the inside temperature of the vehicle using the sensors 160 when the heating function is operating. The controller 190 may compare the measured inside temperature with the target temperature stored in the memory (not shown) to determine whether the inside temperature is lower than the target temperature. The target temperature may be variably set by the user.

When it is identified in S160 that the inside temperature is lower than the target temperature, the controller 190 may determine the operation mode as the second mode, that is, the heating humidification mode (S170). When the operation mode is determined as the second mode, the controller 190 may supply the water stored in the water supply tank 105 to the heating apparatus 140 while operating the heating apparatus 140. The heating apparatus 140 may heat the water supplied from the water supply tank 105 and supply the gas (the water vapor) vaporized by the heating to the second duct 125. Because the dry air exhausted from the HVAC apparatus 115 to the second duct 125 is humidified by the moisture supplied from the heating apparatus 140 and supplied into the vehicle interior, the inside temperature may be adjusted while adjusting the inside humidity of the vehicle. As described above, because the warm water vapor is supplied into the vehicle using the heating apparatus 140, it is possible to assist in the heating while humidifying the interior of the vehicle. The controller 190 may continuously check the inside temperature using the in-car sensor, and convert the operation mode from the second mode to the fourth mode when the inside temperature reaches the target temperature.

When it is identified in S150 that the heating function is inactive, the controller 190 may determine the operation mode as the third mode, that is, the ultrasonic humidification mode (S180). The third mode is a mode of performing the humidification because the ultrasonic generator 1302 of the humidification apparatus 130 is operated to decompose the water in the water trap 1301 and supply the decomposed water molecules into the vehicle.

When the inside temperature is equal to or higher than the target temperature in S160, the controller 190 may determine the operation mode as the fourth mode, that is, the hybrid humidification mode (S190). The fourth mode is a mode of simultaneously performing the ultrasonic-type humidification and the heating-type humidification by operating the humidification apparatus 130 and the heating apparatus 140.

When the operation mode is determined as the third mode and the fourth mode, the controller 190 may perform smart humidification control (S200). The smart humidification control refers to controlling the humidified air and the dry air in a separated manner in connection with the operation of the humidification function by identifying the inside and outside air conditions of the vehicle using the sensors 160 to prevent the moisture generated on the window during the humidification.

Figure 14:
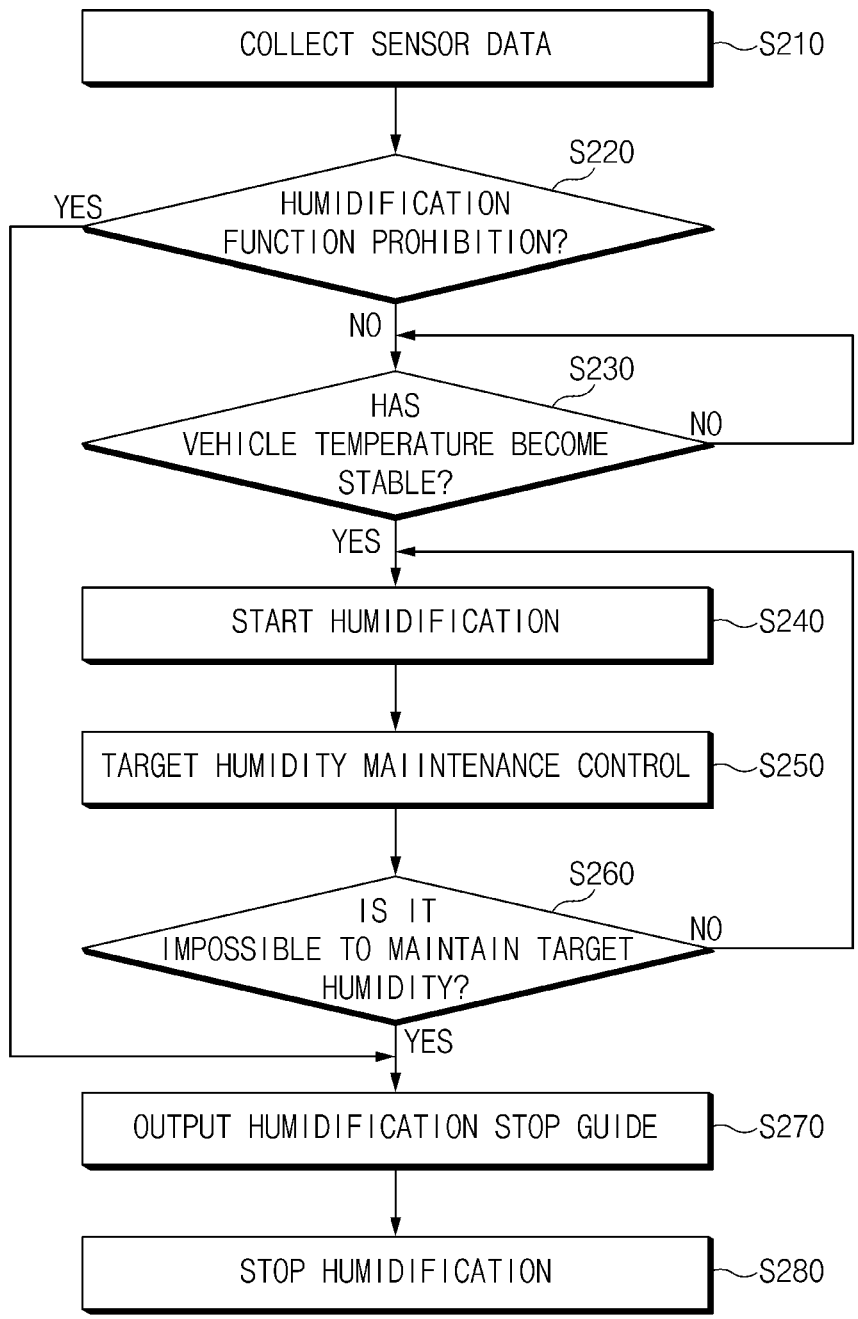
FIG. 14 is a flowchart illustrating a smart humidification control method according to embodiments of the present disclosure.

FIG. 14 is a flowchart illustrating a smart humidification control method according to embodiments of the present disclosure.

The controller 190 may collect sensor data when starting the smart humidification control (S210). The controller 190 may collect the initial sensor data measured by the sensors 160 in the state in which the humidification function is not operated. The controller 190 may measure the outside air temperature, the inside temperature, the window surface temperature, the inside humidity, the coolant temperature, and/or the vent temperature of the HVAC apparatus 115 using the AMB sensor, the in-car sensor, the ADS sensor, the humidity sensor, the WTS sensor, and/or the vent temperature sensor.

The controller 190 may determine the humidification function prohibition based on the collected sensor data (S220). The controller 190 may determine the humidification function operation prohibition in the case in which the inside relative humidity exceeds the critical humidity, in the case in which the outside air temperature is out of the critical temperature range, and in the case in which the situation such as the sensor failure (the error), the humidification function failure (the error), the heating wire failure, and/or the lack of the water in the humidifier, occurs.

When the humidification function prohibition is not determined, the controller 190 may determine whether the vehicle temperature has become stable (S230). The controller 190 may determine whether the vehicle temperature has become stable based on the coolant temperature and the vent temperature of the HVAC apparatus 115. For example, the controller 190 may determine that the vehicle temperature has become stable when the coolant temperature is equal to or higher than 80° C. or the vent temperature is equal to or higher than 35° C.

The controller 190 may start the humidification when the vehicle temperature has become stable (S240). When the coolant temperature reaches 80° C. or the vent temperature reaches 35° C., the controller 190 may start (perform) the proportional integral derivative (PID) control using the humidity sensor such that the inside humidity of the vehicle reaches the target relative humidity set by the user. The target relative humidity that may be set by the user may be limited in the range from 30% to 60%. The user is only able to set the target relative humidity, and is not able to identify the relative humidity that changes in real time. When the user selects the automatic control, the controller 190 may perform the HD control to maintain the inside humidity of the vehicle at the optimum humidity amount, for example, in the range from 40% to 50%. The controller 190 may selectively perform the control based on the initial relative humidity rather than start the humidification unconditionally even when the operation mode enters the humidification on mode. For example, when the target relative humidity is higher than the current relative humidity, the controller 190 may immediately start the operation of the humidification function. As another example, the controller 190 may maintain the humidification function in the stationary state when the current relative humidity is already higher than the target relative humidity, and start the humidification function when the current relative humidity becomes lower than the target relative humidity.

The controller 190 may perform target humidity maintenance control such that the inside humidity of the vehicle maintains the target humidity after starting the operation of the humidification function (S250). The controller 190 may determine the humidification time point based on the inside temperature of the vehicle during the target humidity maintenance control.

For example, when the inside humidity is higher than the target humidity in the situation in which the inside temperature is lower than the target inside temperature, the controller 190 may wait until the inside humidity naturally decreases as the inside temperature rises, and may start the humidification from the time point at which the current inside humidity becomes lower than the target humidity. On the other hand, when the inside humidity is lower than the target humidity in the situation in which the inside temperature is lower than the target temperature, the controller 190 may start the humidification immediately regardless of whether the target temperature is reached.

As another example, when the inside temperature exceeds the target temperature, the controller 190 may operate the air conditioner to maintain the humidification stop state until the inside temperature reaches the target temperature. The controller 190 may start the humidification after the inside temperature reaches the target temperature. In addition, when the inside temperature is lowered to the target temperature only by the inflow of the outside air, the controller 190 may start the humidification from the time point at which the inside temperature reaches 'target temperature+5° C.'.

As another example, when the inside temperature and the target temperature match, the controller 190 may adjust the humidification amount such that the inside humidity may maintain the target humidity. In other words, the controller 190 may maintain the inside humidity at the target humidity by adjusting the humidification amount supplied into the vehicle after the inside temperature reaches the target temperature.

As another example, when the target temperature is out of the appropriate temperature range (e.g., from 15 to 20° C.), the controller 190 may stop the humidification and output the notification notifying the humidification stop. For example, when the user manually set the 'max warm' and the 'blower max', the inside temperature may reach the temperature in the range from 30 to 40° C. or higher. Thus, when the inside humidity is controlled to be in the range from 40 to 50% or higher, the vehicle interior may become excessively hot and humid, so that the controller 190 may stop the humidification. In addition, when the user manually set the 'max cool' and the 'blower max', or set the 'FATC auto' and set the target temperature very low, the dehumidification may occur by the cooling operation even when the humidification is performed, so that the controller 190 may stop the humidification.

When it is difficult to maintain the target humidity even when the humidification amount reaches the minimum or maximum, the controller 190 may allow the target humidity to be maintained through the cooperative control with the devices capable of adjusting the humidity. For example, when it is difficult to maintain the target humidity even when the humidification amount reaches the maximum, for example, when the inflow amount of the outside air is excessive, and thus, the dry air is excessively flowed to the interior, the controller 190 may increase the mixing amount of the inside air of the inlet door of the HVAC apparatus 115 that determines the inflow amount of the outside air while maintaining the maximum humidification amount, thereby performing the control to follow the target humidity. In addition, the controller 190 may allow the target humidity to be followed by increasing and decreasing the humidification amount while minimizing the mixing amount of the inside air of the inlet of the HVAC apparatus 115.

As another example, when it is difficult to maintain the target humidity even when the humidification amount reaches the minimum or when the humidification is stopped, for example, when the humidification is not required and the dehumidification is required because the inside humidity is high, the outside air suction amount of the HVAC apparatus 115 may be set to 100%, and the air conditioner may be operated only when the outside air suction control is not sufficient.

The controller 190 may determine whether it is impossible to maintain the target humidity and the target surface temperature (S260).

When it is impossible to maintain the target humidity and the target surface temperature, the controller 190 may output the guide (the notification) notifying the humidification stop (S270). The controller 190 may output the guide phrase indicating the humidification stop on a display of the cluster or an infotainment terminal.

The controller 190 may stop the humidification while outputting the humidification stop notification (S280).

Figure 15:
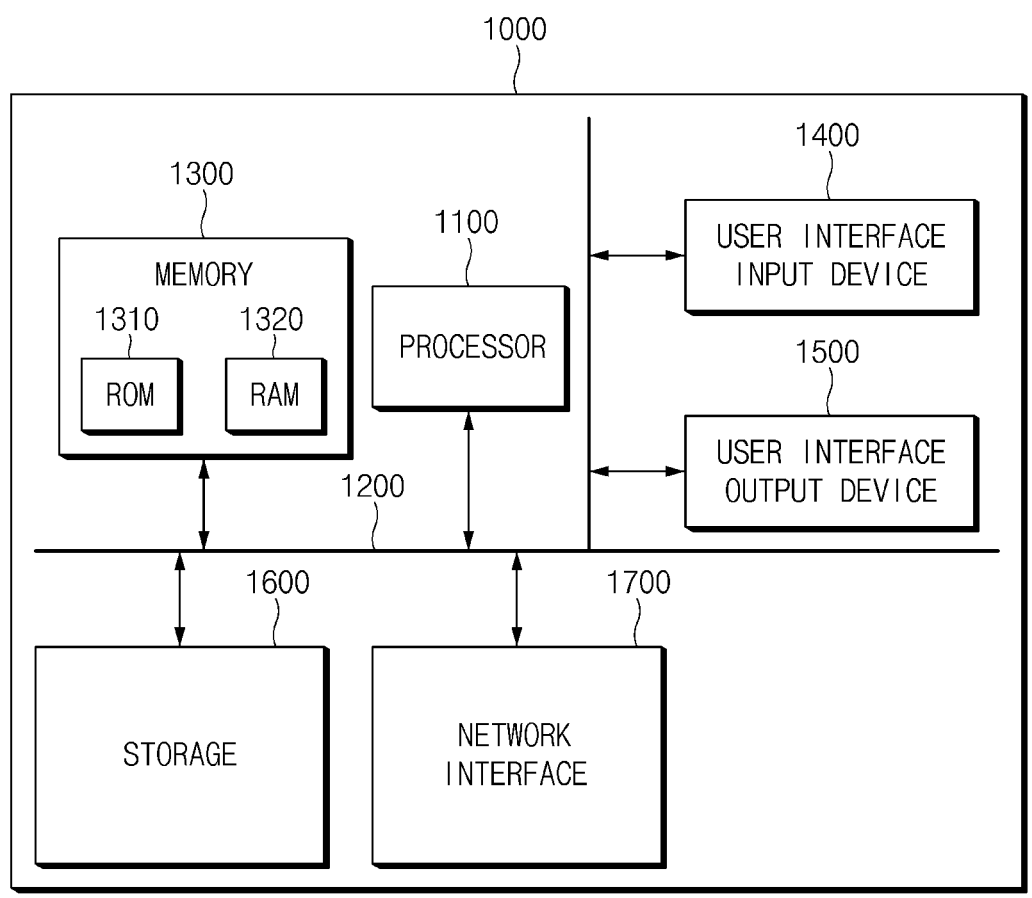
FIG. 15 is a block diagram illustrating a computing system that executes a humidification method of a fuel cell electric vehicle according to embodiments of the present disclosure.

FIG. 15 is a block diagram illustrating a computing system that executes a humidification method of a fuel cell electric vehicle according to embodiments of the present disclosure.

Referring to FIG. 15, a computing system 1000 may include at least one processor 1100, a memory 1300, a user interface input device 1400, a user interface output device 1500, storage 1600, and a network interface 1700 connected via a bus 1200.

The processor 1100 may be a central processing unit (CPU) or a semiconductor device that performs processing on commands stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium is coupled to the processor 1100, which may read information from, and write information to, the storage medium. In another method, the storage medium may be integral with the processor 1100. The processor 1100 and the storage medium may reside within an application specific integrated circuit (ASIC). The ASIC may reside within the user terminal. In another method, the processor 1100 and the storage medium may reside as individual components in the user terminal.

The description above is merely illustrative of the technical idea of the present disclosure, and various modifications and changes may be made by those skilled in the art without departing from the essential characteristics of the present disclosure. Therefore, the embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

According to the present disclosure, because the inside humidity of the vehicle is controlled using the water generated during the power generation in the fuel cell stack, it is possible to provide convenience to the user because water for the humidification is not replenished.

In addition, according to the present disclosure, because the associated control of dualizing the air exhausted from the HVAC apparatus during the inside humidification to supply the dry air to the window and to supply the humidified air into the vehicle interior is performed, the fogging (the moisture generation) of the window glass resulted from the difference between the inside and outside temperatures of the vehicle may be blocked fundamentally while adjusting the inside humidity of the vehicle.

In addition, according to the present disclosure, it is possible to minimize the window moisture generation by exhausting the humidified air supplied into the vehicle directly to the outside.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A system for humidification of a fuel cell electric vehicle, the system comprising:
    a fuel cell stack for generating electrical energy through an electrochemical reaction of hydrogen and oxygen;
    a water supply tank for storing water generated during the electrical energy generation in the fuel cell stack;
    a first duct for supplying air exhausted from a heating, ventilation, and air conditioning (HVAC) apparatus to a vehicle glass;
    a second duct for supplying air exhausted from the HVAC apparatus into a vehicle interior;
    a humidification apparatus for humidifying air supplied through the second duct using water supplied from the water supply tank, wherein the humidification apparatus includes:
        a water trap for storing water supplied from the water supply tank;
        a first humidifier including an ultrasonic generator for generating an ultrasonic wave to decompose water stored in the water trap; and
        a second humidifier including a heating apparatus for heating water supplied from the water supply tank to generate water vapor and supplying the generated water vapor to the second duct; and
    a controller configured to supply air to the vehicle glass through the first duct to perform anti-fogging control of the vehicle glass when adjusting an inside humidity of the vehicle using the humidification apparatus.

2. The system of claim 1, wherein the first duct guides dry air exhausted from the HVAC apparatus to at least one of a wind shield glass or a side glass of the vehicle,
    wherein the second duct guides air humidified by the humidification apparatus to a vent hole located in at least one of a center or a floor of each seat row of the vehicle.

3. The system of claim 1, wherein the controller is configured to control the HVAC apparatus to maintain an outside air circulation mode during the humidification.

4. The system of claim 1, wherein the controller is configured to control a check valve mounted on a humidification line for connecting the second duct and the humidification apparatus to each other to prevent moisture remaining in the humidification line from flowing back into the HVAC apparatus.

5. The system of claim 1, wherein the controller is configured to:
    collect initial sensor data using at least one sensor; and
    determine prohibition of an operation of a humidification function based on the sensor data,
    wherein the at least one sensor includes at least one of an outside air temperature sensor, an inside temperature sensor, a surface temperature sensor, a humidity sensor, a coolant temperature sensor, or a vent temperature sensor.

6. The system of claim 1, wherein the controller is configured to perform control such that the inside humidity maintains a target humidity by operating the humidification apparatus when a vehicle temperature has become stable.

7. The system of claim 6, wherein the controller is configured to control the inside humidity to maintain the target humidity by adjusting at least one of a humidification time point or a humidification amount based on an inside temperature of the vehicle.

8. A method for humidification of a fuel cell electric vehicle including a water supply tank for storing water generated during power generation in a fuel cell stack, a first duct and a second duct connected to a vent of a heating, ventilation, and air conditioning (HVAC) apparatus, and a humidification apparatus for supplying moisture to the second duct using water supplied from the water supply tank, the method comprising:
    adjusting, by a controller, an inside humidity of the vehicle using the humidification apparatus; and
    performing, by the controller, anti-fogging control of a vehicle glass by supplying air to the vehicle glass through the first duct when adjusting the inside humidity;
    wherein the humidification apparatus includes;
        a water trap for storing water supplied from the water supply tank;
        a first humidifier including an ultrasonic generator for generating an ultrasonic wave to decompose water stored in the water trap; and
        a second humidifier including a heating apparatus for heating water supplied from the water supply tank to generate water vapor and supplying the generated water vapor to the second duct.

9. The method of claim 8, wherein adjusting the inside humidity of the vehicle includes:
    collecting initial sensor data using at least one sensor;
    determining prohibition of an operation of a humidification function based on the sensor data;
    determining whether a vehicle temperature has become stable when the operation of the humidification function is permitted; and
    performing control such that the inside humidity maintains a target humidity by operating the humidification apparatus when the vehicle temperature has become stable,
    wherein the sensor data includes at least one of an outside air temperature, an inside temperature, a window surface temperature, the inside humidity, a coolant temperature, or a vent temperature.

10. The method of claim 9, wherein performing the control such that the inside humidity maintains the target humidity includes:
    adjusting at least one of a humidification time point or a humidification amount based on the inside temperature of the vehicle.

11. The method of claim 8, wherein adjusting the inside humidity of the vehicle includes:
    determining an operation mode of the humidification apparatus based on at least one of a vehicle state, an HVAC apparatus state, or an inside temperature of the vehicle.

12. The method of claim 11, wherein determining the operation mode includes:
    determining whether a water level of the water supply tank exceeds a reference water level when a humidification function is in an inactive state while the vehicle is being parked or stopped; and
    determining the operation mode as an evaporation drainage mode when the water level of the water supply tank exceeds the reference water level.

13. The method of claim 12, wherein adjusting the inside humidity of the vehicle includes:
    vaporizing water supplied from the water supply tank into water vapor using a heating apparatus; and
    exhausting the water vapor vaporized by the heating apparatus to the outside of the vehicle.

14. The method of claim 11, wherein determining the operation mode includes:
- determining whether a heating function is in an active state when a humidification function is in an active state;
- measuring the inside temperature using a sensor and comparing the measured inside temperature with a target temperature when the heating function is in the active state; and
- determining the operation mode as a heating humidification mode when the inside temperature is lower than the target temperature.

15. The method of claim 14, wherein adjusting the inside humidity of the vehicle includes:
- heating water supplied from the water supply tank using a heating apparatus; and
- supplying water vapor vaporized by the heating of the heating apparatus to the second duct.

16. The method of claim 14, wherein determining the operation mode further includes:
- determining the operation mode as an ultrasonic humidification mode when the heating function is in an inactive state.

17. The method of claim 16, wherein adjusting the inside humidity of the vehicle further includes:
- supplying water stored in the water supply tank to a water trap in the humidification apparatus by controlling a pump located between the water supply tank and the humidification apparatus;
- decomposing water inside the water trap by operating an ultrasonic generator installed inside the water trap; and
- supplying the decomposed water to the second duct.

18. The method of claim 14, wherein determining the operation mode further includes:
- determining the operation mode as a hybrid humidification mode when the inside temperature is equal to or higher than the target temperature.

19. The method of claim 18, wherein adjusting the inside humidity of the vehicle further includes:
- supplying water stored in the water supply tank to a heating apparatus and a water trap in the humidification apparatus;
- decomposing water inside the water trap by operating an ultrasonic generator in the water trap;
- generating, by the heating apparatus, water vapor by heating water supplied from the water supply tank; and
- supplying the water vapor and the decomposed water to the second duct.

* * * * *